United States Patent
Yokoyama

(10) Patent No.: US 8,149,665 B2
(45) Date of Patent: Apr. 3, 2012

(54) OPTICAL DISC DEVICE

(75) Inventor: Eiji Yokoyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 847 days.

(21) Appl. No.: 11/896,748

(22) Filed: Sep. 5, 2007

(65) Prior Publication Data

US 2009/0003168 A1    Jan. 1, 2009

Related U.S. Application Data

(63) Continuation-in-part of application No. PCT/JP2006/304315, filed on Mar. 7, 2006.

(30) Foreign Application Priority Data

Mar. 9, 2005 (JP) .................................. 2005-065102

(51) Int. Cl.
  G11B 20/18 (2006.01)
  G11B 7/00 (2006.01)
  G11B 7/135 (2006.01)
(52) U.S. Cl. .............. 369/53.17; 369/44.21; 369/112.11
(58) Field of Classification Search ............... 369/44.15, 369/44.21, 44.22, 53.17, 112.08, 112.11, 369/112.2, 112.23, 112.24, 112.26
See application file for complete search history.

(56) References Cited

U.S. PATENT DOCUMENTS

| 6,208,597 | B1 * | 3/2001 | Yoshimi | 369/44.29 |
| 2001/0003518 | A1 * | 6/2001 | Fujinami | 369/47.29 |
| 2001/0019522 | A1 * | 9/2001 | Mita et al. | 369/47.19 |
| 2002/0089912 | A1 * | 7/2002 | Kobayashi | 369/53.23 |
| 2006/0198259 | A1 * | 9/2006 | Yumita | 369/44.28 |

FOREIGN PATENT DOCUMENTS

| JP | 3-235226 A | 10/1991 |
| JP | 3-235227 A | 10/1991 |
| JP | 5-101565 A | 4/1993 |
| JP | 9-027164 A | 1/1997 |
| JP | 11-175984 A | 7/1999 |

* cited by examiner

Primary Examiner — Joseph Feild
Assistant Examiner — Aneeta Yodichkas
(74) Attorney, Agent, or Firm — Birch, Stewart, Kolasch & Birch, LLP.

(57) ABSTRACT

Means (101a) for evaluating positional control deviation and means (102a) for outputting a corrective signal, this being a set of signals with kick and brake functions, to an actuator (10) on the basis of the evaluation result are provided. Although control deviation may increase due to external shock or vibration acting on the disc device or when a disc having eccentricity, wobble, or another physical deformity is reproduced, the control deviation is suppressed without loss of control stability, and stable recording and reproducing is always possible.

20 Claims, 25 Drawing Sheets

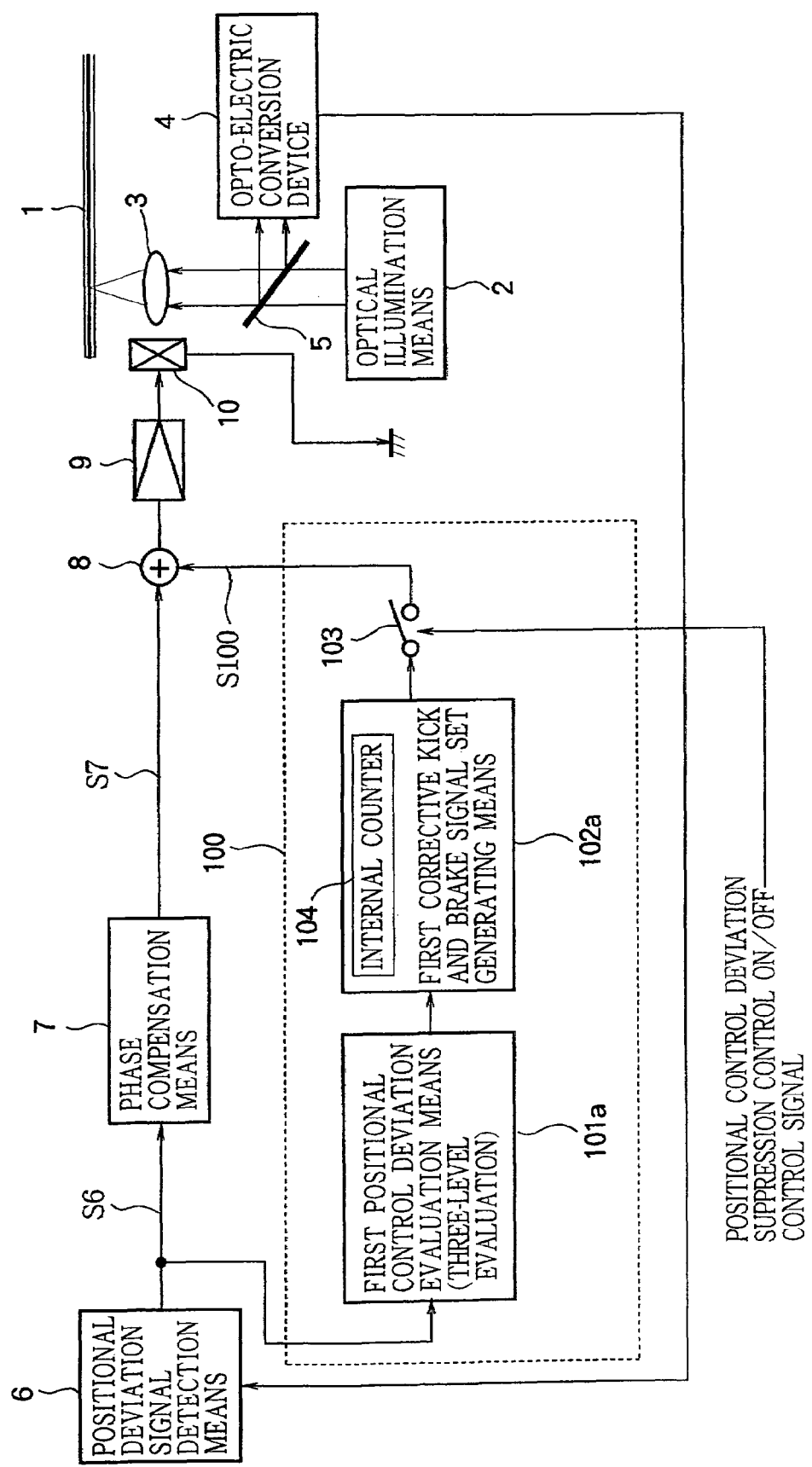

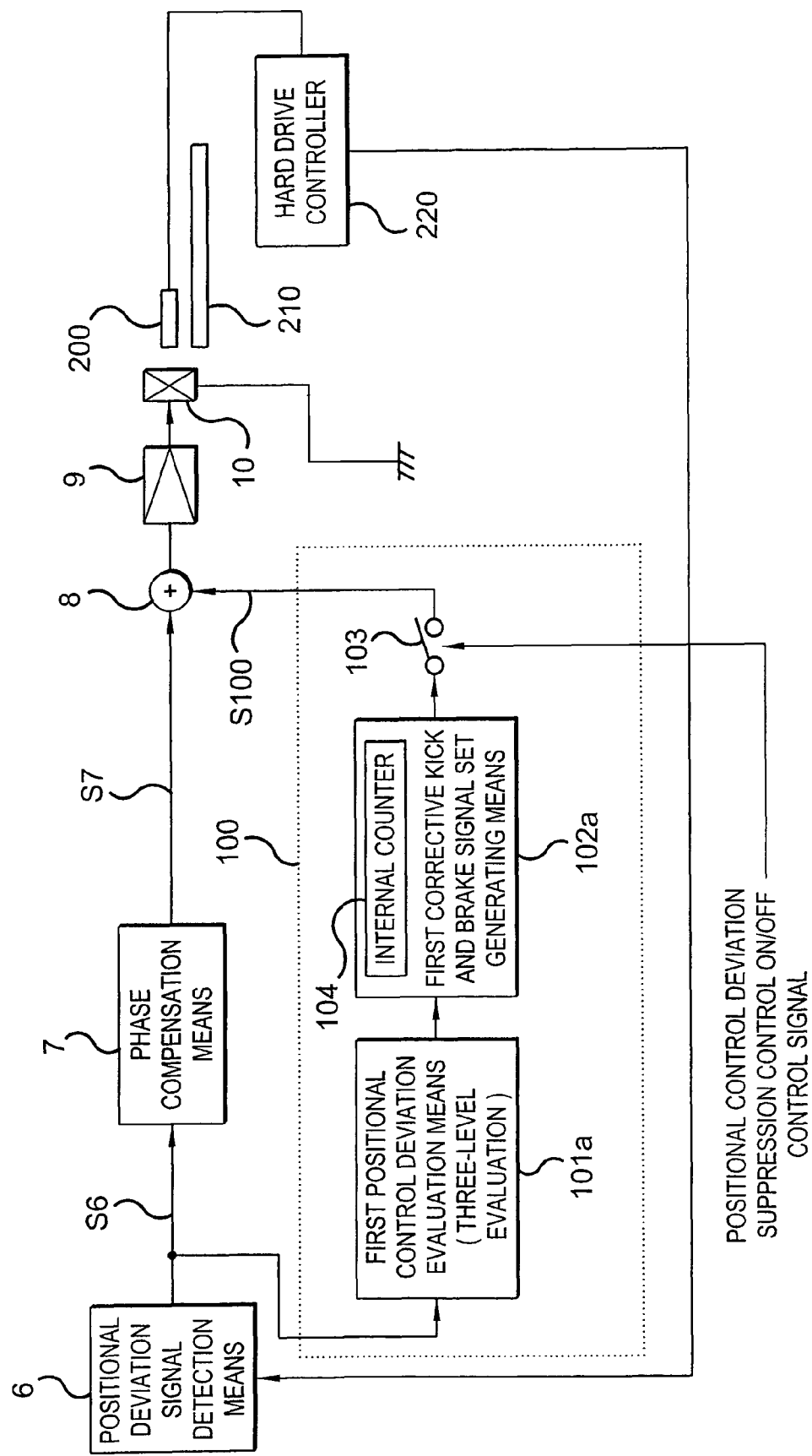

DETECTION CHARACTERISTIC OF
POSITIONAL DEVIATION SIGNAL
DETECTION MEANS 6

FIG. 5

TABLE DESCRIBING OPERATION OF FIRST CORRECTIVE KICK AND BRAKE SIGNAL SET GENERATING MEANS 102a (THREE-LEVEL EVALUATION)

| STATE TRANSITION MODE | STATE TRANSITION CONDITION | COUNTER1 | OUTPUT | EVALUATION DURING OPERATION |
|---|---|---|---|---|
| idle_mode | COUNTER_ZERO | reset | 0 | ST0 |
| 1+kick_mode | ST1+ | up | nl_out | ST1+ |
| 1+brake_mode | ST0 | down (STEPS OF n) | −nl_out | ST1+ OR ST0 |
| 1−kick_mode | ST1− | up | −nl_out | ST1− |
| 1−brake_mode | ST0 | down (STEPS OF n) | nl_out | ST1− OR ST0 |

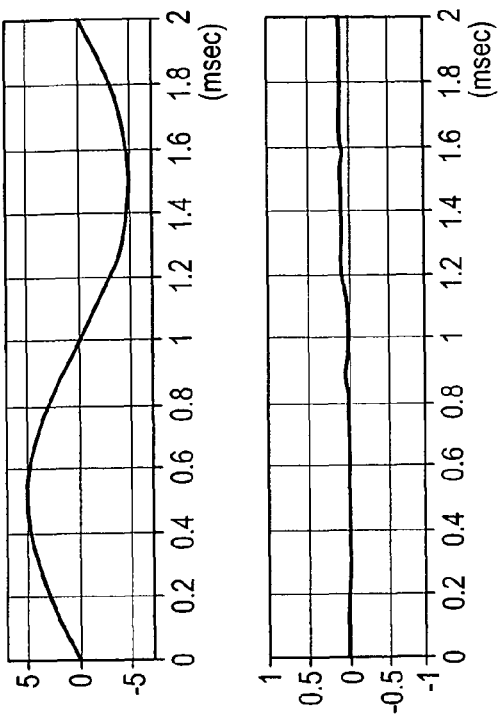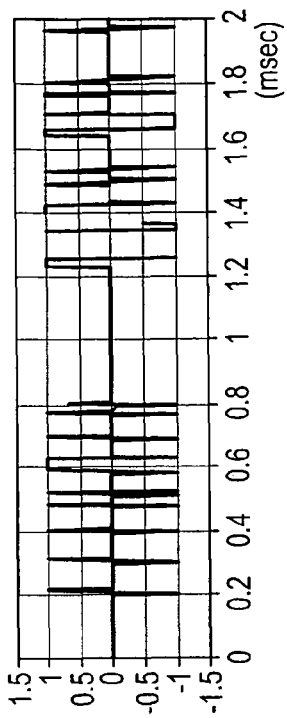
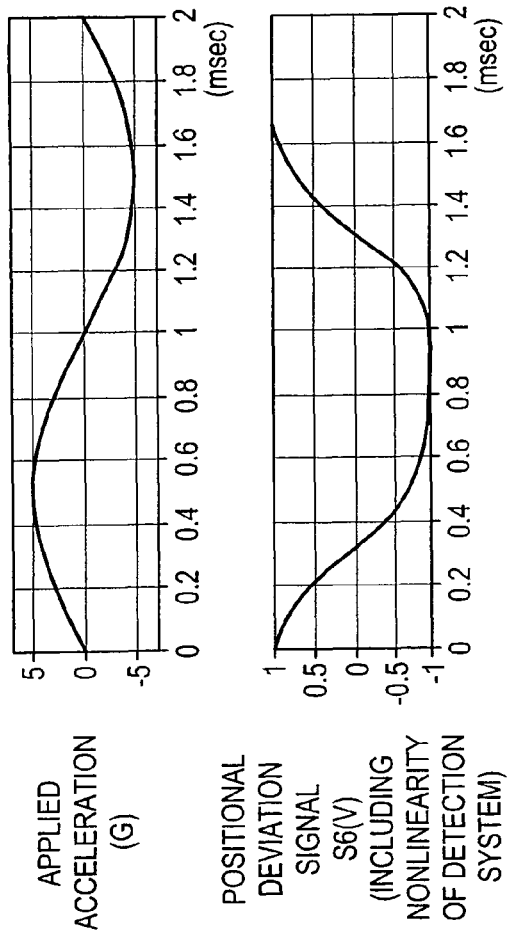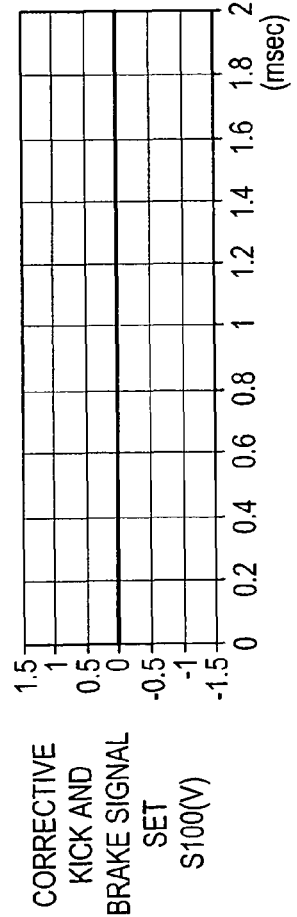
FIG.6A — OPERATION OF CONVENTIONAL POSITIONAL CONTROL SYSTEM (POSITIONAL CONTROL DEVIATION SUPPRESSION CONTROL OFF)
FIG.6B — OPERATION OF POSITIONAL CONTROL SYSTEM OF THE PRESENT INVENTION (POSITIONAL CONTROL DEVIATION SUPPRESSION CONTROL ON)

INPUT SIGNAL k=0
(ZERO-ORDER HOLD)

K=0.5

K=1.0

K=1.5

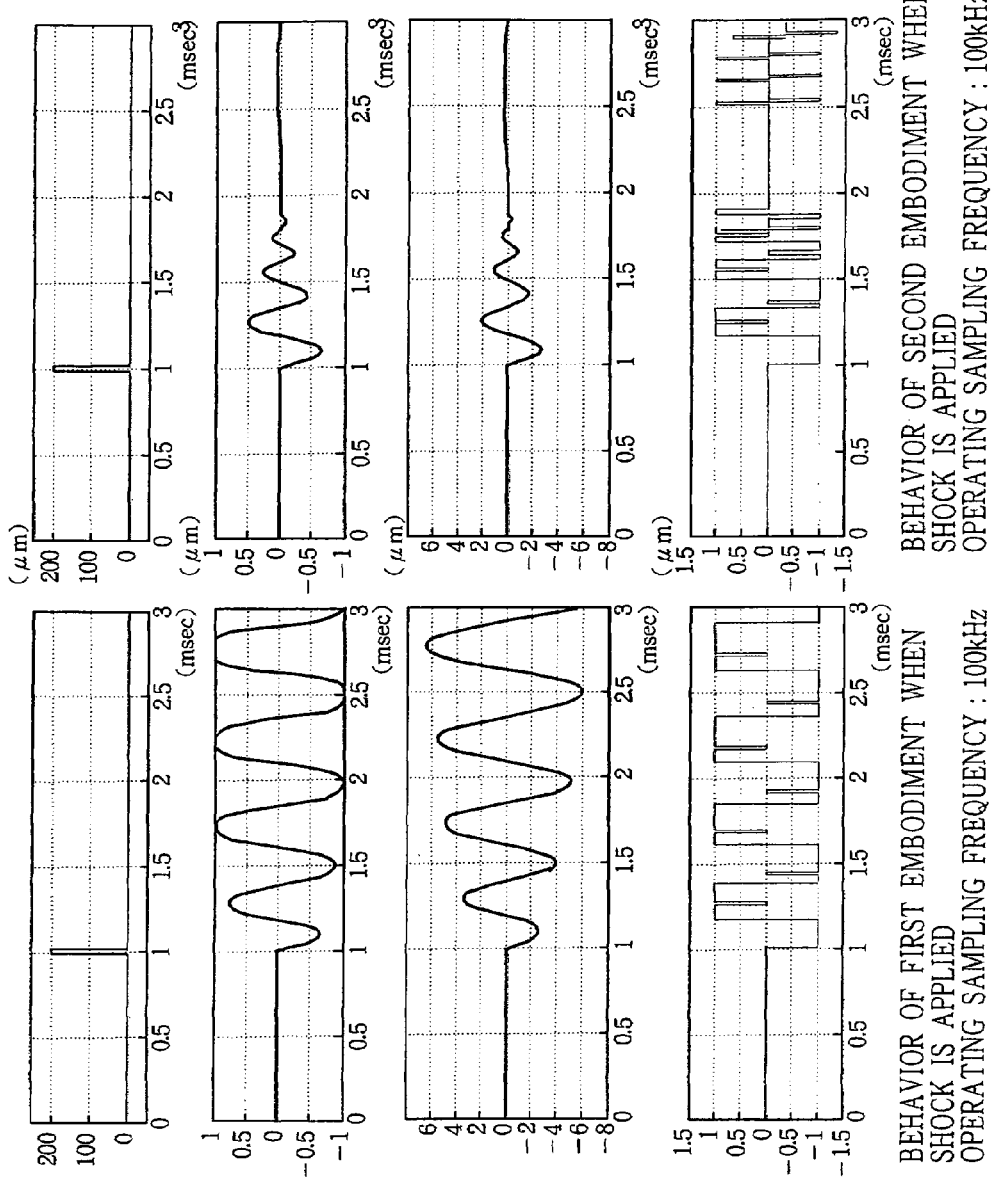

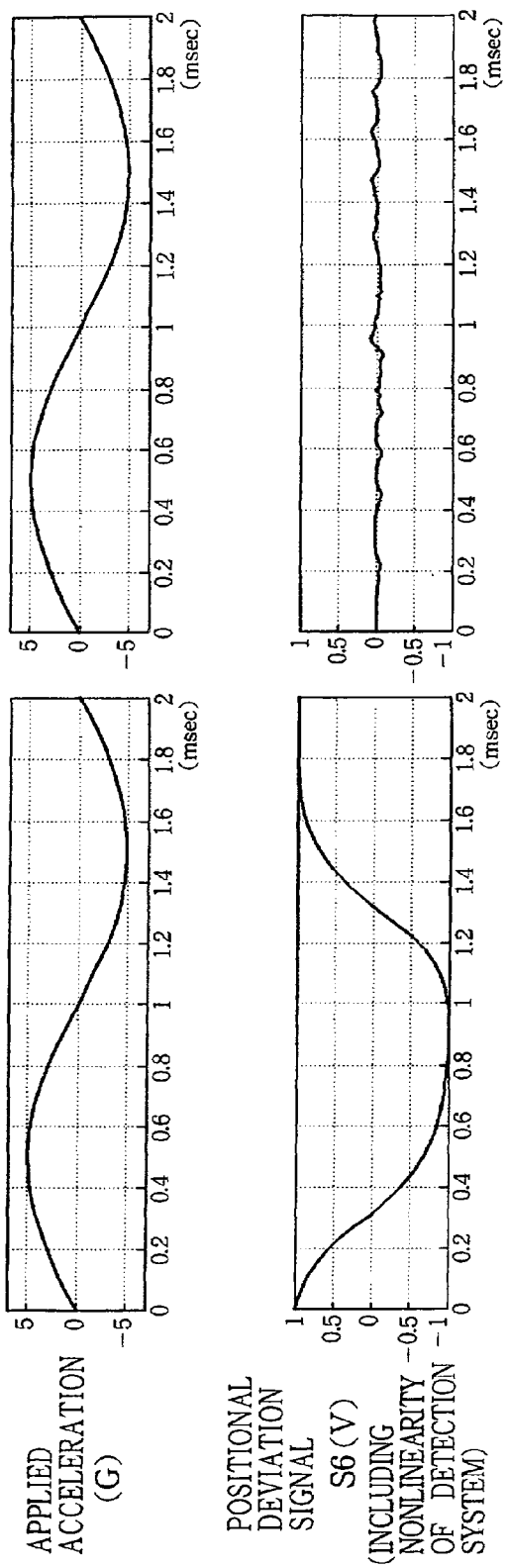
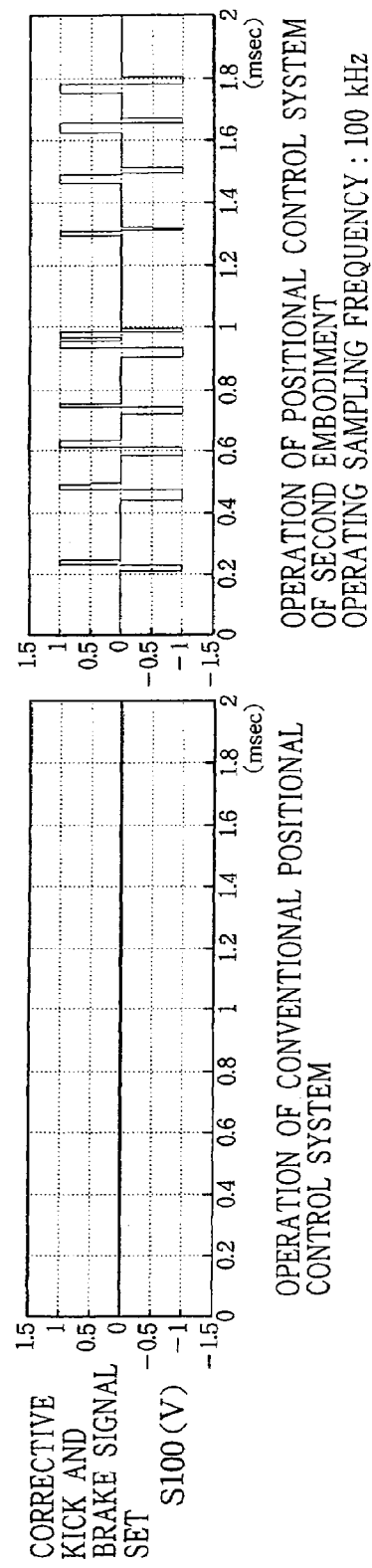
FIG.13 (a) OPERATION OF CONVENTIONAL POSITIONAL CONTROL SYSTEM
FIG.13 (b) OPERATION OF POSITIONAL CONTROL SYSTEM OF SECOND EMBODIMENT OPERATING SAMPLING FREQUENCY: 100 kHz FIG.14(a)
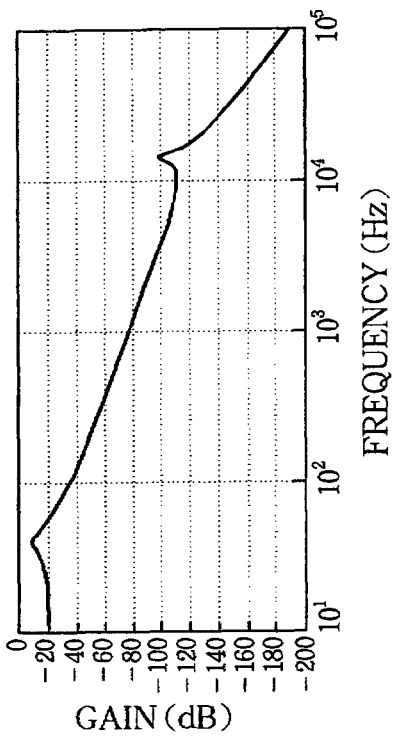
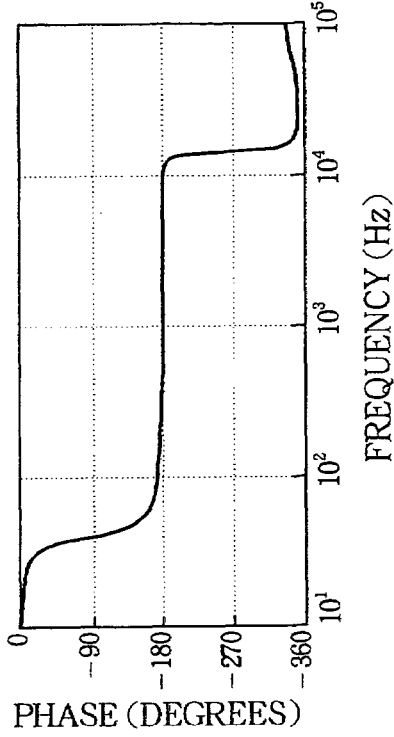
FREQUENCY CHARACTERISTIC OF DRIVING MEANS WITH HIGH-ORDER ANTI-RESONANCE
FIG.14(b)
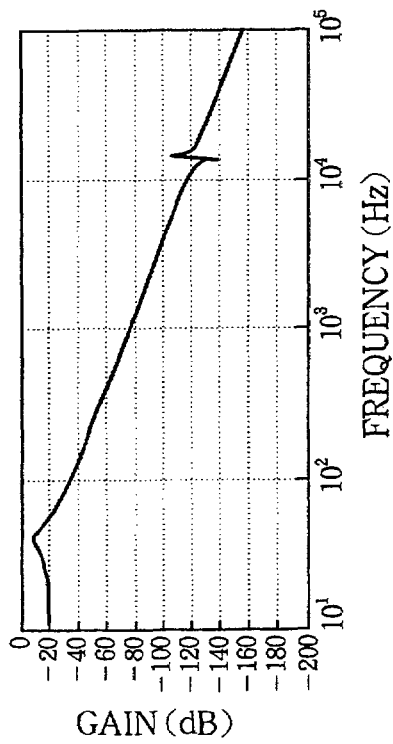
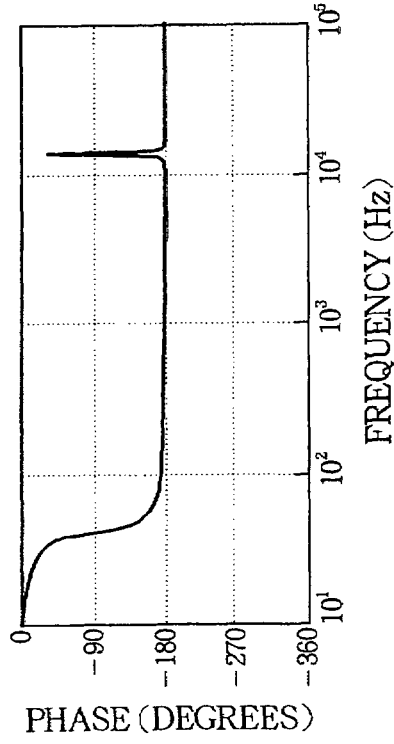
FREQUENCY CHARACTERISTIC OF DRIVING MEANS OF HIGH-ORDER FORWARD-RESONANCE

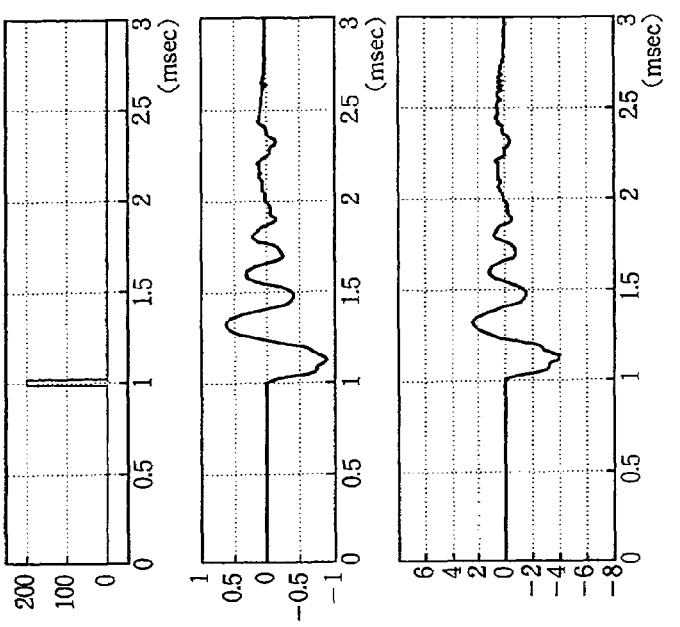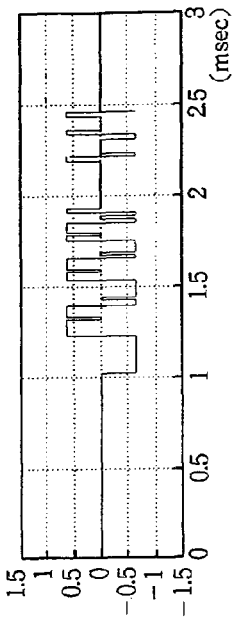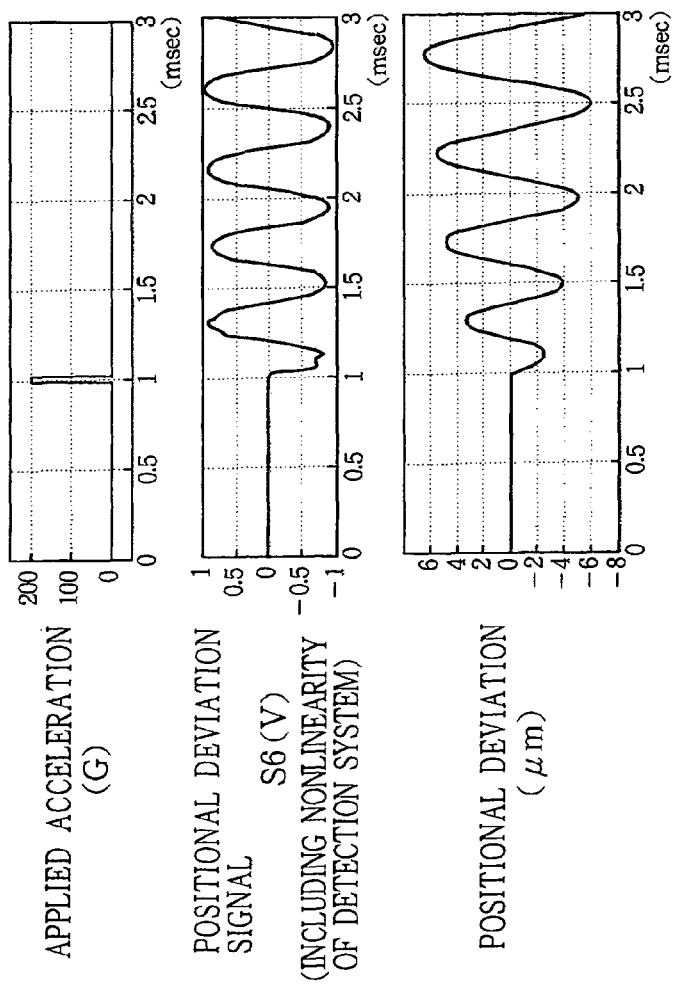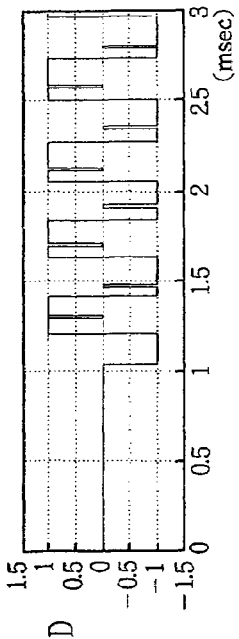
FIG.15(a) BEHAVIOR OF FIRST EMBODIMENT WHEN SHOCK IS APPLIED : DRIVING MEANS WITH FORWARD RESONANCE DRIVING ELEMENT
FIG.15(b) BEHAVIOR OF FIRST EMBODIMENT WHEN SHOCK IS APPLIED : AMPLITUDE OF CORRECTIVE KICK AND BRAKE SIGNALS SET TO 64%

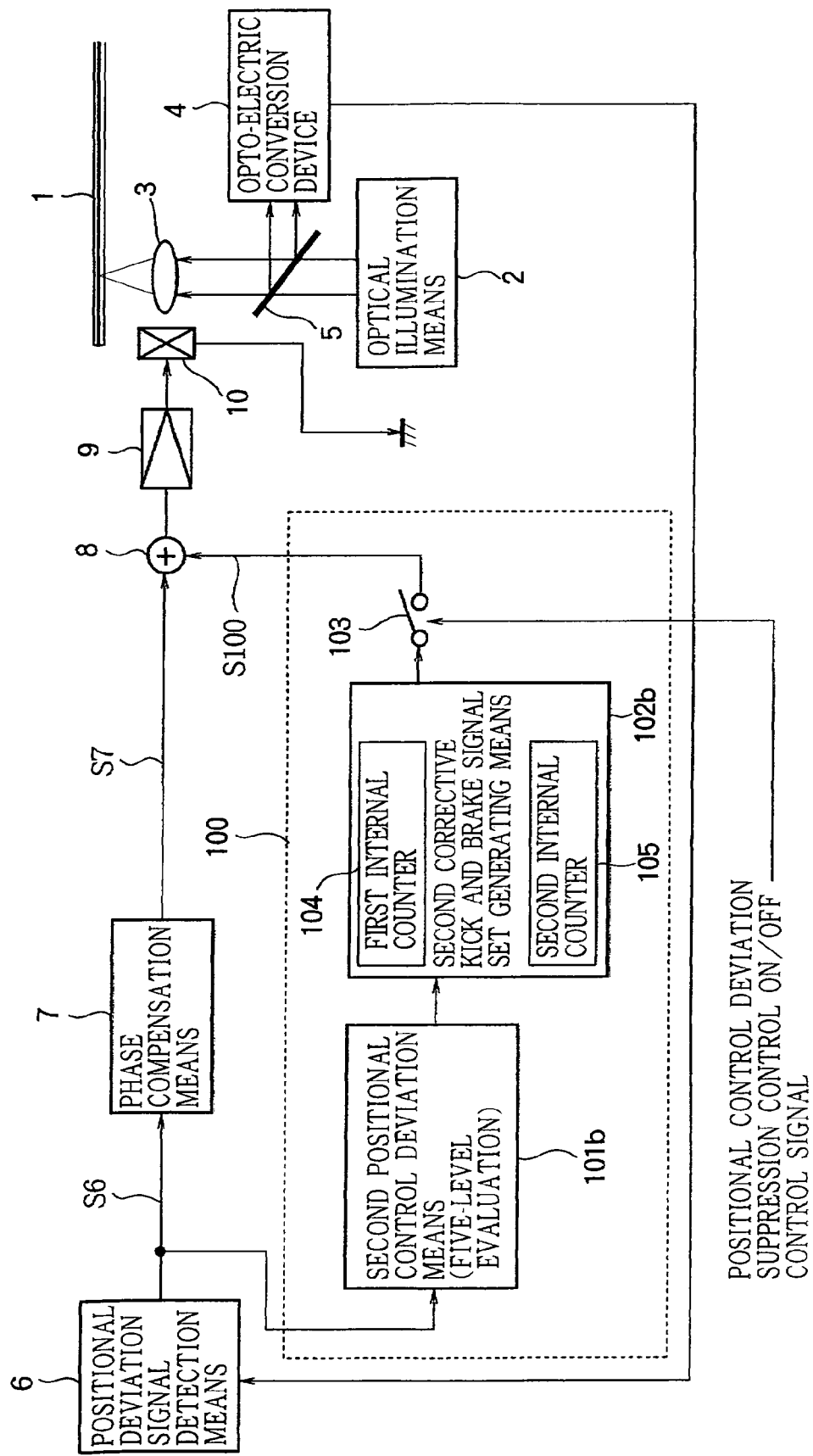

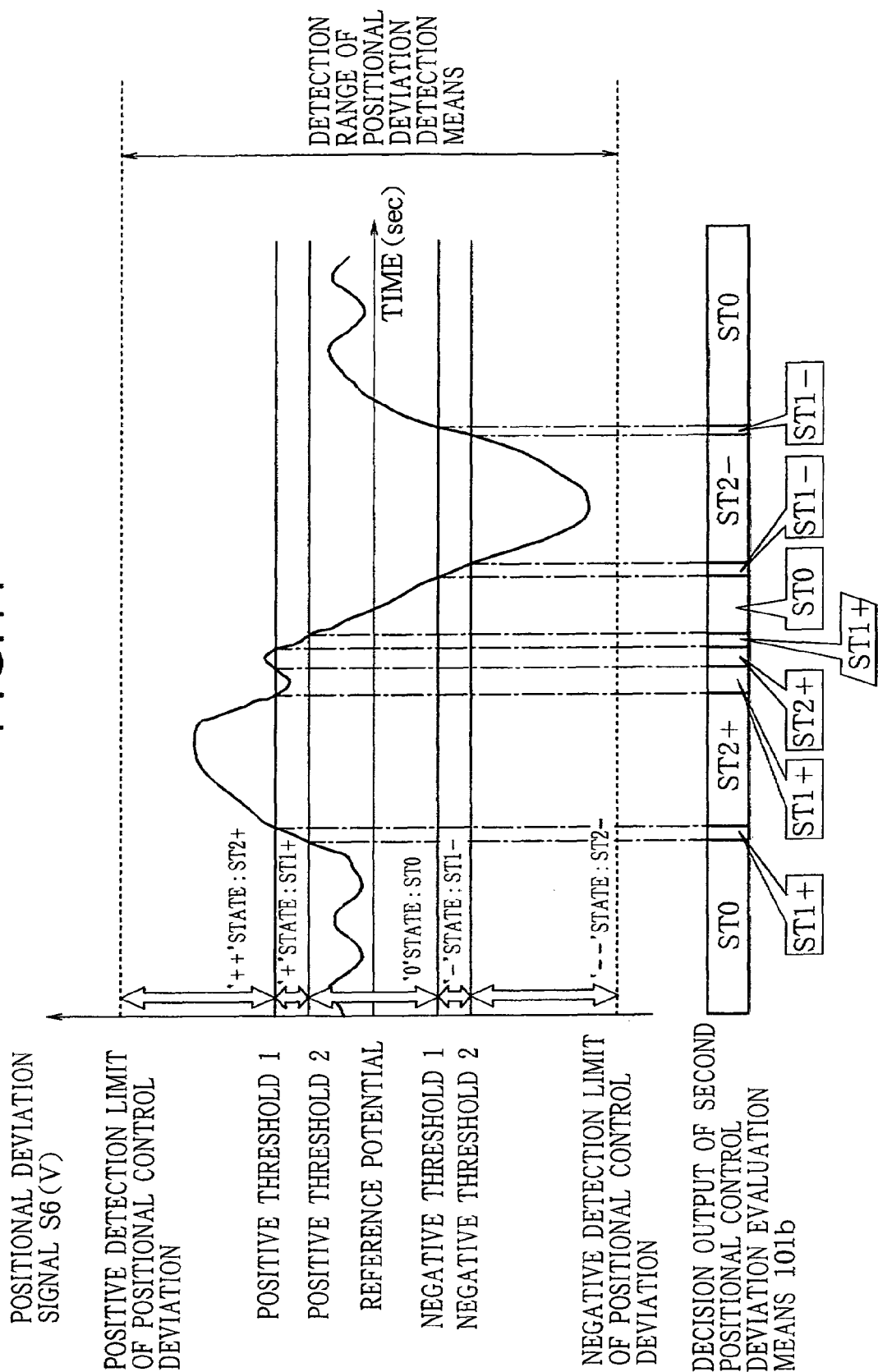

FIG.19

TABLE DESCRIBING OPERATION OF SECOND CORRECTIVE KICK AND BRAKE SIGNAL SET GENERATING MEANS 102b (FIVE-LEVEL EVALUATION)

| STATE TRANSITION MODE | STATE TRANSITION CONDITION | COUNTER1 | COUNTER2 | OUTPUT | EVALUATION DURING OPERATION |
|---|---|---|---|---|---|
| idle_mode | COUNTER_ZERO | reset | reset | 0 | ST0 |
| 1+kick_mode | ST1+ OR ST2+ | up | reset | nl_out | ST1+ OR ST2+ |
| 2+kick_mode | ST2+ | reset | up | -nl_out*B | ST2+ |
| 1+brake_mode | ST0 | down(STEPS OF n) | reset | -nl_out | ST1+ OR ST0 |
| 2+brake_mode | ST1+ OR ST0 | reset | down(STEPS OF n) | -nl_out*B | ST2+ OR ST1+ OR ST0 |
| 1-kick_mode | ST1- OR ST2- | up | reset | -nl_out | ST1- OR ST2- |
| 2-kick_mode | ST2- | reset | up | -nl_out*B | ST2- |
| 1-brake_mode | ST0 | down(STEPS OF n) | reset | nl_out | ST1- OR ST0 |
| 2-brake_mode | ST1- OR ST0 | reset | down(STEPS OF n) | nl_out*B | ST2- OR ST1- OR ST0 |

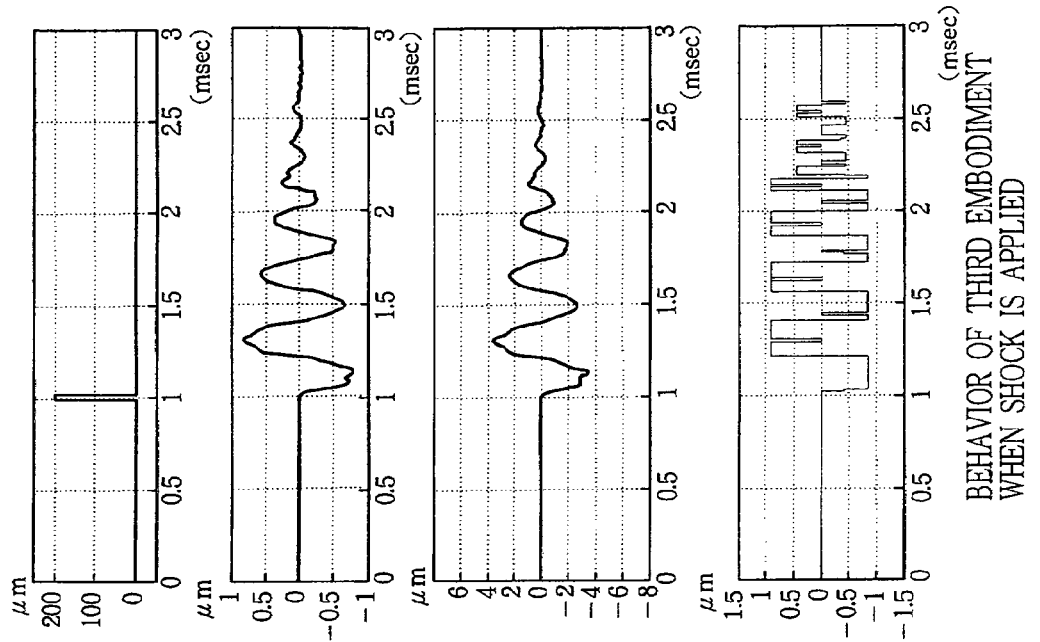
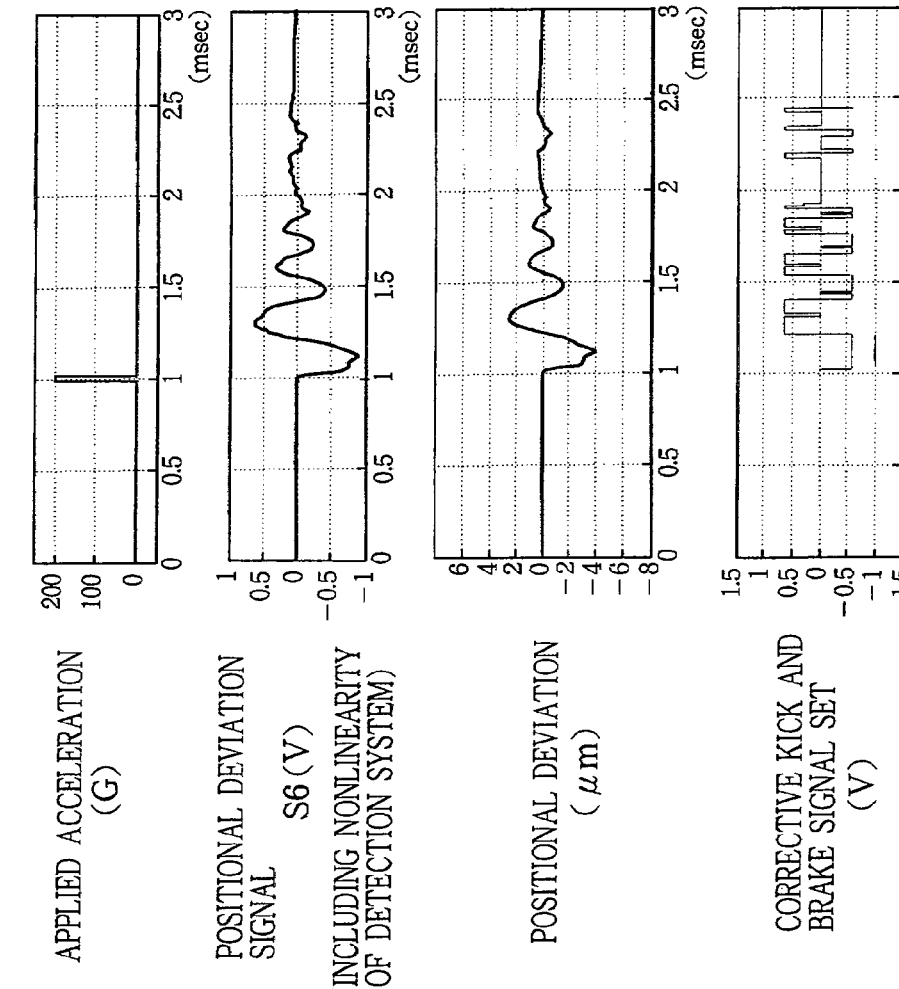

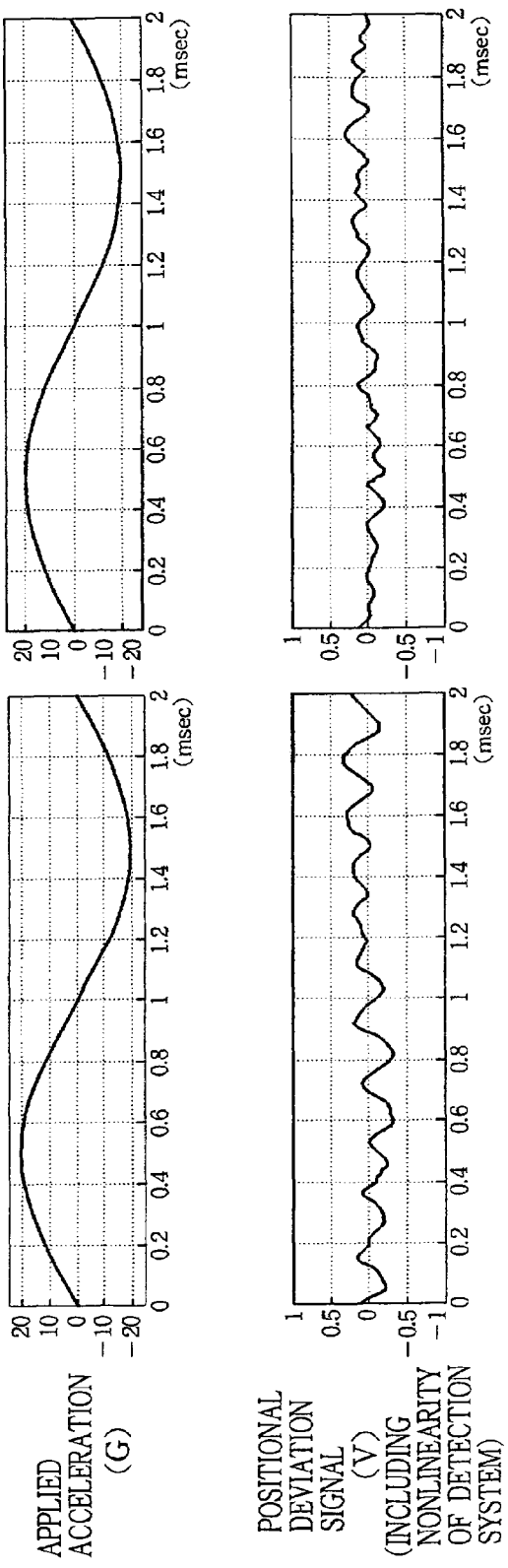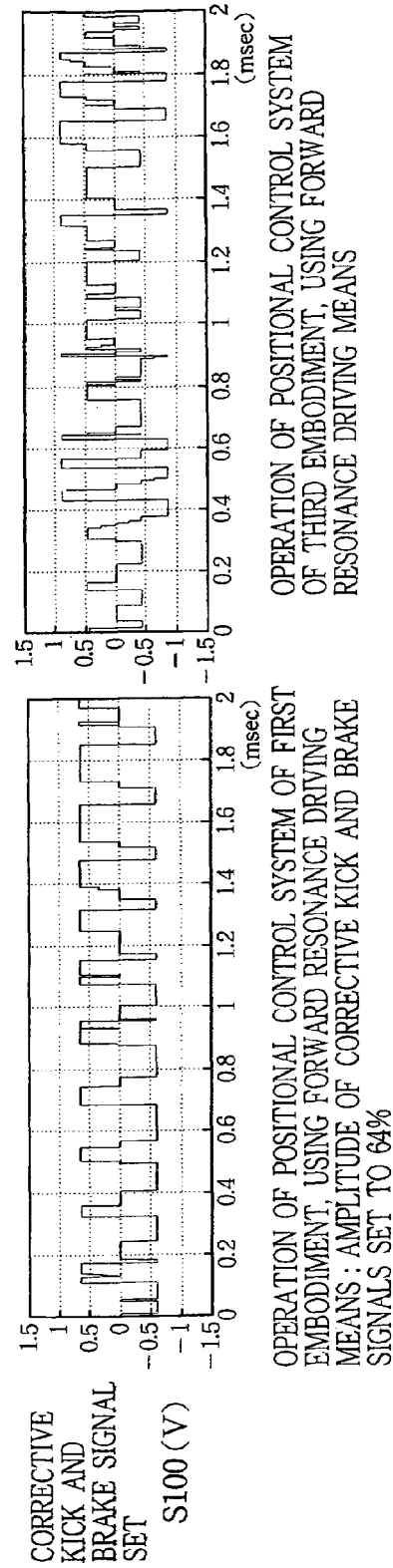
FIG.21 (a) / FIG.21 (b)
OPERATION OF POSITIONAL CONTROL SYSTEM OF FIRST EMBODIMENT, USING FORWARD RESONANCE DRIVING MEANS: AMPLITUDE OF CORRECTIVE KICK AND BRAKE SIGNALS SET TO 64%
OPERATION OF POSITIONAL CONTROL SYSTEM OF THIRD EMBODIMENT, USING FORWARD RESONANCE DRIVING MEANS FIG.23(a)
FIG.23(b)
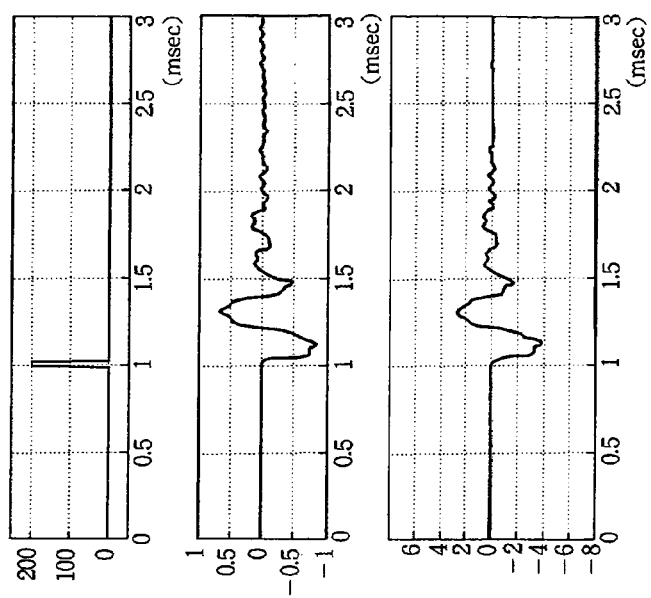
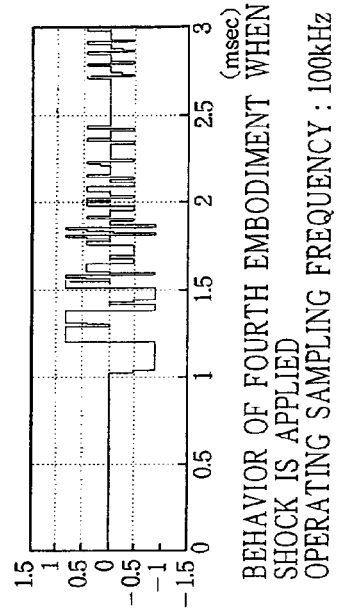
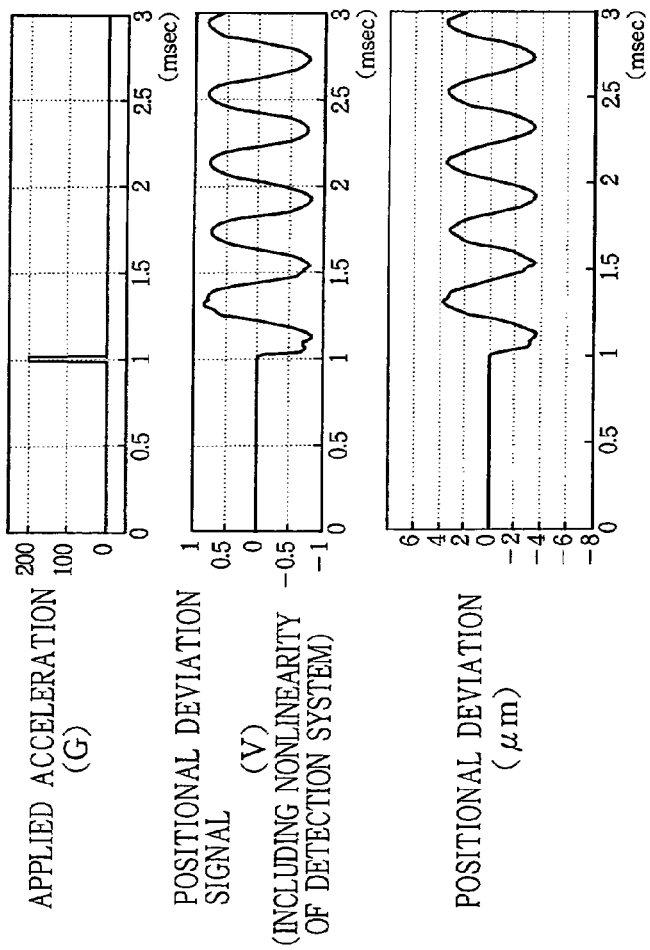
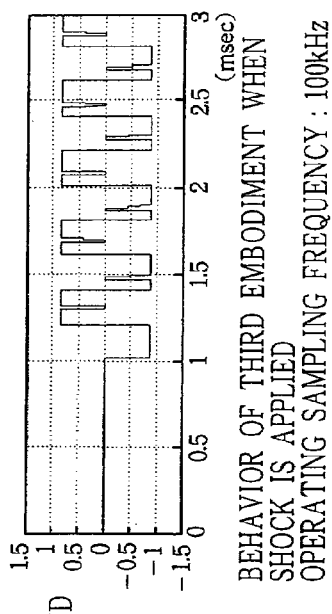
BEHAVIOR OF THIRD EMBODIMENT WHEN SHOCK IS APPLIED
OPERATING SAMPLING FREQUENCY : 100kHz
BEHAVIOR OF FOURTH EMBODIMENT WHEN SHOCK IS APPLIED
OPERATING SAMPLING FREQUENCY : 100kHz

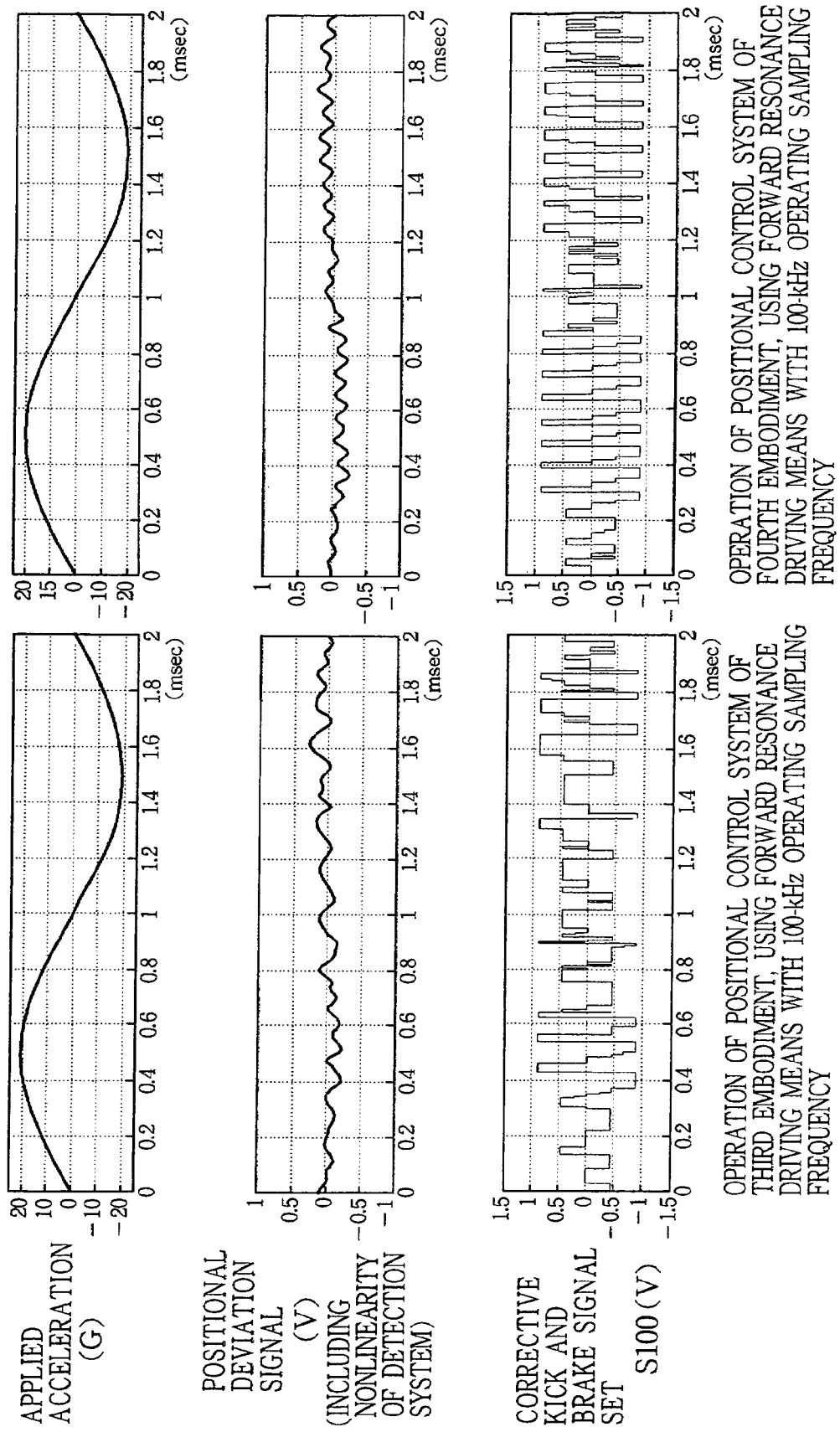
FIG.24 (a) / FIG.24 (b)

OPTICAL DISC DEVICE

This application is a Continuation-In-Part of copending PCT International Application No. PCT/PCT/JP2006/304315 filed on Mar. 7, 2006, which designated the United States and on which priority is claimed under 35 U.S.C. §120 on Patent Application No(s). 2005-065102 filed in Japan on Mar. 9, 2005, the entire contents of which are hereby incorporated by reference.

FIELD OF THE INVENTION

The present invention relates to a rotating disc device, more particularly to a positional control deviation suppression control system that prevents increased positional control deviation stemming from external vibrational disturbances acting on the rotating disc device and increased residual positional deviation stemming from discs with a large physical deformity (the term 'physical deformity' as used herein refers to wobble in the focus direction and eccentricity in the track direction) and suppresses loss of control of an optical or magnetic pick-up.

BACKGROUND ART

Various methods have been considered to maintain continuity of the reproduced signal in conventional optical disc devices and spinning magnetic disc devices when information is recorded or read on the disc under vibrating conditions. In Patent Document 1, for example, additional memory is provided to store the reproduced signal, high-speed reading is performed, and the reproduced signal is temporarily stored in the memory, then read out sequentially, so even if control of the pick-up servo is lost due to vibration etc., continuous reproduction is possible even during the vibration by reading the information stored in the memory and retrying the control operation until the information in the memory is exhausted. In the method described in Patent Document 2, an additional acceleration sensor is provided to detect vibration, and the detected vibration information is added to the servo loop of the pick-up to cancel the effect of the external vibration on the pick-up.

Patent Document 1: Japanese Patent Application Publication No. 5-202565 (pp. 1-7, FIG. 1)

Patent Document 2: Japanese Patent Application Publication No. 9-27164 (pp. 1-5, FIG. 1)

DISCLOSURE OF THE INVENTION

Problems to be Solved by the Invention

A problem with the conventional anti-vibration methods is that they lead to an expensive device: in Patent Document 1, for example, extra memory is required, and in Patent Document 2, an acceleration sensor is required.

Means of Solution of the Problems

This invention provides an optical disc device comprising:

an optical illumination means for directing light onto an optical disc to form a light spot;

a driving means for performing a predetermined operation on an objective lens in relation to the optical disc, based on a driving control signal;

an opto-electric conversion means for outputting reflected light information related to light reflected from the optical disc;

a positional deviation signal detection means for detecting a relative positional error between the objective lens and the optical disc on the basis of the reflected light information;

a control signal generating means for generating a control signal defining a control quantity in the predetermined operation, based on the positional deviation signal obtained from the positional deviation signal detection means;

a positional control error evaluation means for evaluating the positional deviation signal;

a corrective kick and brake signal set generating means for outputting a corrective kick and brake signal set including a kick signal followed continuously by a brake signal for the driving means, based on the evaluation result of the positional control error evaluation means;

an adding means for adding the corrective kick and brake signal set and the control signal; and a switching means disposed between the corrective kick and brake signal set generating means and the adding means to switch the adding of the corrective kick and brake signal set to the control signal on and off.

This invention also provides a magnetic disc device comprising:

a magnetic head for recording or reproducing information on a magnetic disc;

a driving means for performing a predetermined operation on the magnetic head in relation to the magnetic disc, based on a driving control signal;

a positional deviation signal detection means for detecting a relative positional error between the magnetic head and the magnetic disc on the basis of information obtained from the magnetic disc;

a control signal generating means for generating a control signal defining a control quantity in the predetermined operation, based on the positional deviation signal obtained from the positional deviation signal detection means;

a positional control deviation evaluation means for evaluating the positional deviation signal;

a corrective kick and brake signal set generating means for outputting a corrective kick and brake signal set including a kick signal followed continuously by a brake signal for the driving means, based on an evaluation result of the positional control deviation evaluation means;

an adding means for adding the corrective kick and brake signal set and the control signal; and a switching means disposed between the corrective kick and brake signal set generating means and the adding means to switch the adding of the corrective kick and brake signal set to the control signal on and off.

Effect of the Invention

The disc devices of the present invention function to suppress to low levels not only residual deviation due to physical deformities such as eccentricity and wobble but also residual deviation due to acceleration shock, including shock waves, acting from outside the system, with the result that recording and reproduction can be carried out in a stable manner. The function of this invention is implemented in a digital logic circuit with a certain sampling frequency, so it can be implemented as hard logic in an LSI control chip, but it can also be implemented as F/W (firmware) in a general-purpose microcontroller, so it can suppress positional control errors effectively without added hardware costs.

BRIEF DESCRIPTION OF THE DRAWINGS

FIG. 1 is a block diagram illustrating an alternative first embodiment of the invention.

FIG. 1A is a block diagram illustrating an alternative first embodiment of the invention.

FIG. 5 is a table illustrating the operating functions of the first corrective kick and brake signal set generating means 102a in the first and second embodiments of the invention.

FIGS. 6(a) and 6(b) illustrate effects in the first embodiment of the invention.

FIGS. 12(a) and 12(b) illustrate effects in the second embodiment of the invention.

FIGS. 13(a) and 13(b) illustrate effects in the second embodiment of the invention.

FIGS. 14(a) and 14(b) illustrate frequency characteristics of the driving means in embodiments of the invention.

FIGS. 15(a) and 15(b) illustrate effects in a third embodiment of the invention.

FIG. 16 is a block diagram of the third embodiment of the invention.

FIG. 17 illustrates operating states of the second positional control deviation evaluation means 101b in the third and a fourth embodiment of the invention.

FIG. 19 is a table illustrating the operating functions of the second corrective kick and brake signal set generating means 102b in the third and fourth embodiments of the invention.

FIGS. 20(a) and 20(b) illustrate effects in the third embodiment of the invention.

FIGS. 21(a) and 21(b) illustrate effects in the third embodiment of the invention.

FIGS. 23(a) and 23(b) illustrate effects in the fourth embodiment of the invention.

FIGS. 24(a) and 24(b) illustrate effects in the fourth embodiment of the invention.

Figure 2:
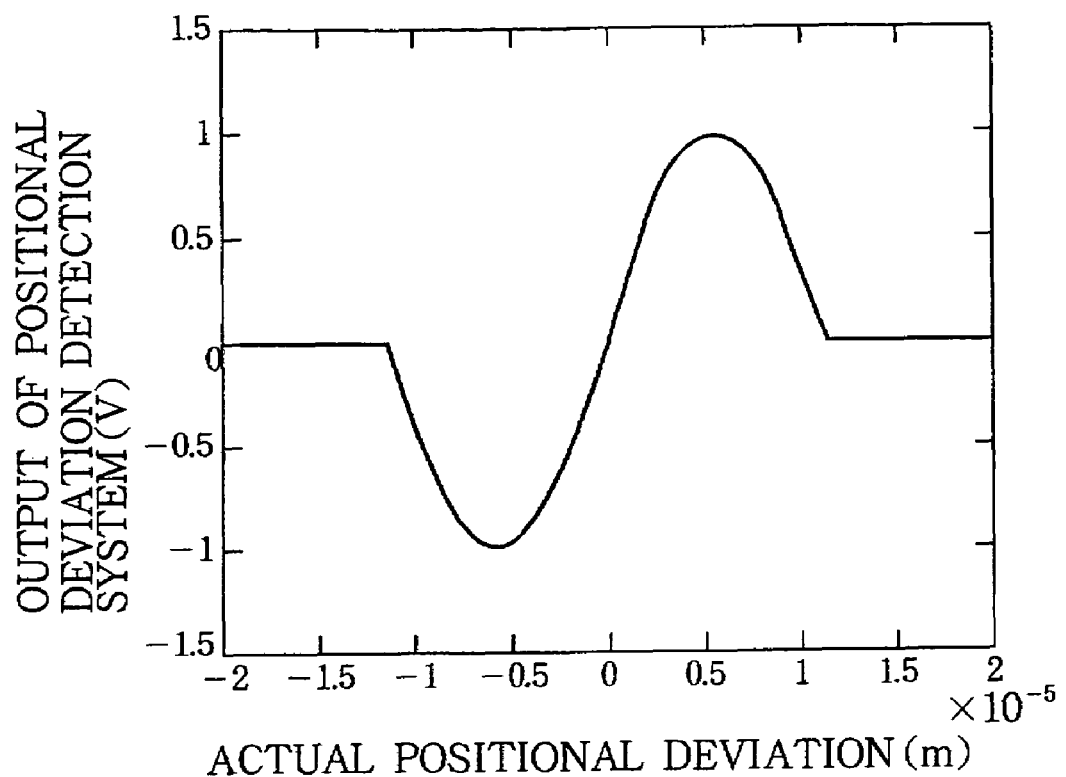
FIG. 2 illustrates the positional deviation detection characteristic of the positional deviation signal detection means 6 in the embodiments of the invention.

EXPLANATION OF REFERENCE CHARACTERS 1 optical disc, 2 optical illumination means, 3 objective lens, 4 opto-electric conversion device, 5 half-mirror, 6 positional deviation signal detection means, 7 phase compensation means, 8 adding means, 9 driver amplifier, 10 actuator driving coil, 100 positional control deviation suppression control means, 101a first positional control deviation evaluation means, 101b second positional control deviation evaluation means, 102a first corrective kick and brake signal set generating means, 102b second corrective kick and brake signal set generating means, 103 switching means, 104 internal counter, 105 internal counter, 107 phase advancing means, 107a register, 107b subtracting means, 107c amplifying means, 107d adding means, 200 magnetic read head, 210 magnetic disc, 220 hard drive controller.

BEST MODE OF PRACTICING THE INVENTION

Examples will be described in which the positional control deviation suppression control device, which is the characteristic part of the optical disc device of the present invention, is implemented as a digital operation circuit in a digital operation functional element.

First Embodiment

FIG. 1 is a block diagram illustrating the optical disc device in a first embodiment of the invention.

In the recording or reproduction of data, a laser beam emitted from an optical illumination means 2 which includes a semiconductor laser is focused by a half-mirror 5 and objective lens 3 onto the optical disc 1. In the reproduction of data, the light reflected from the disc 1 is input via the half-mirror 5 to an opto-electric conversion device 4.

An actuator driving coil 10 is rigidly connected to the objective lens 3 (firmly connected so that the two move together); the driving coil 10 is disposed in a magnetic circuit and can move the objective lens 3 in the vertical or horizontal direction with respect to the disc 1. Because the objective lens 3 and actuator driving coil 10 are rigidly joined into a single unit as noted above, they will be collectively referred to below as a driving means. The driving means performs a certain operation with respect to the optical disc.

Based on an opto-electrically converted signal (reflected light information), a positional deviation signal detection means 6 outputs a positional deviation signal S6, which indicates relative positional error between the optical disc 1, which is the target tracking position of the objective lens 3, and the actual position of the objective lens 3, to a phase compensation means 7 and a first positional control deviation evaluation means 101a. The detection characteristic is non-linear with respect to both the focusing error detection system and the tracking error detection system. FIG. 2 shows an exemplary detection characteristic of the focusing error detection system. The horizontal axis in FIG. 2 indicates the actual positional deviation ($\times 10^{-5}$ m), and the vertical axis indicates the output (V) of the positional deviation detection system. On the basis of the input signal, the phase compensation means 7 outputs a driving means control signal S7 to the adding means 8. The adding means 8 outputs a signal in which the driving means control signal S7 and the output of a selection switch 103 (described below) are added together. The output of the adding means 8 is input to a driver amplifier 9, and its output is supplied to the actuator driving coil 10, which thereby performs the certain operation mentioned above. Of the above, the functional blocks denoted by reference numerals 1 through 10 form an ordinary positional control loop.

In the optical disc device of the present invention, the following elements are added to this ordinary positional control loop.

The first positional control deviation evaluation means 101a has the function of evaluating the amplitude information of the positional deviation signal S6, or of deciding/evaluating whether the absolute value of the S6 amplitude is or is not less than a predetermined value. When the result of the evaluation is that the absolute value of the S6 amplitude is equal to or greater than the predetermined value, it is also possible to recognize whether it exceeds thresholds on the plus (positive) side and minus (negative) side.

On the basis of the result of the evaluation in the first positional control deviation evaluation means 101a, a first corrective kick and brake signal set generating means 102a outputs a corrective kick signal with a certain amplitude in the direction that will cause the result of the evaluation in the positional control deviation evaluation means 101a to be that the absolute value of the S6 amplitude is less than the predetermined value, for an interval until the result of the evaluation in the positional control deviation evaluation means 101a indicates that the absolute value of the S6 amplitude is less than the predetermined value, and measures the time for which the corrective kick signal is applied. Immediately after the application of the corrective kick signal has ended, it applies a corrective brake signal with the opposite polarity and a certain amplitude for an interval equal to or less than the interval during which the corrective kick signal was applied.

The selection switch 103 controls the supply of the corrective kick and brake signal set, which is the output of the first corrective kick and brake signal set generating means 102a, to the above-mentioned adding means 8 on the basis of a positional deviation suppression control on/off control signal. The function of the selection switch 103 is to prevent the supply of the corrective kick and brake signal set to the driving means when the conventional positional control loop is not closed. The positional deviation suppression control on/off control signal, which is supplied by a master controller (not shown), has content commanding the switch to turn on when the general positional control loop comprising at least functional blocks 1 to 10 is closed and the positional control loop is functioning. The functional blocks 101a to 103 that have been described above will be referred to collectively as the positional control deviation suppression control means 100.

FIG. 1A is a block diagram illustrating a first embodiment of the invention with the optical device replaced by a hard drive containing a magnetic disc 210, a magnetic read head 200, and a hard drive controller 220. The actuator driving coil 10 in this embodiment is connected to the magnetic read head 200 by means of an actuator arm (not shown) contains the head 200.

Based on a signal from the hard drive controller 220, a positional deviation signal detection means 6 outputs a positional deviation signal S6, which indicates relative positional error between the magnetic disc 210, which is the target tracking position of the head 200, and the actual position of the head 200, to a phase compensation means 7 and a first positional control deviation evaluation means 101a. Aside from switching from an optical disc to a magnetic disc, all other aspects of the invention are identical between the first embodiment of FIG. 1 and the alternative first embodiment of FIG. 1A.

Figure 3:
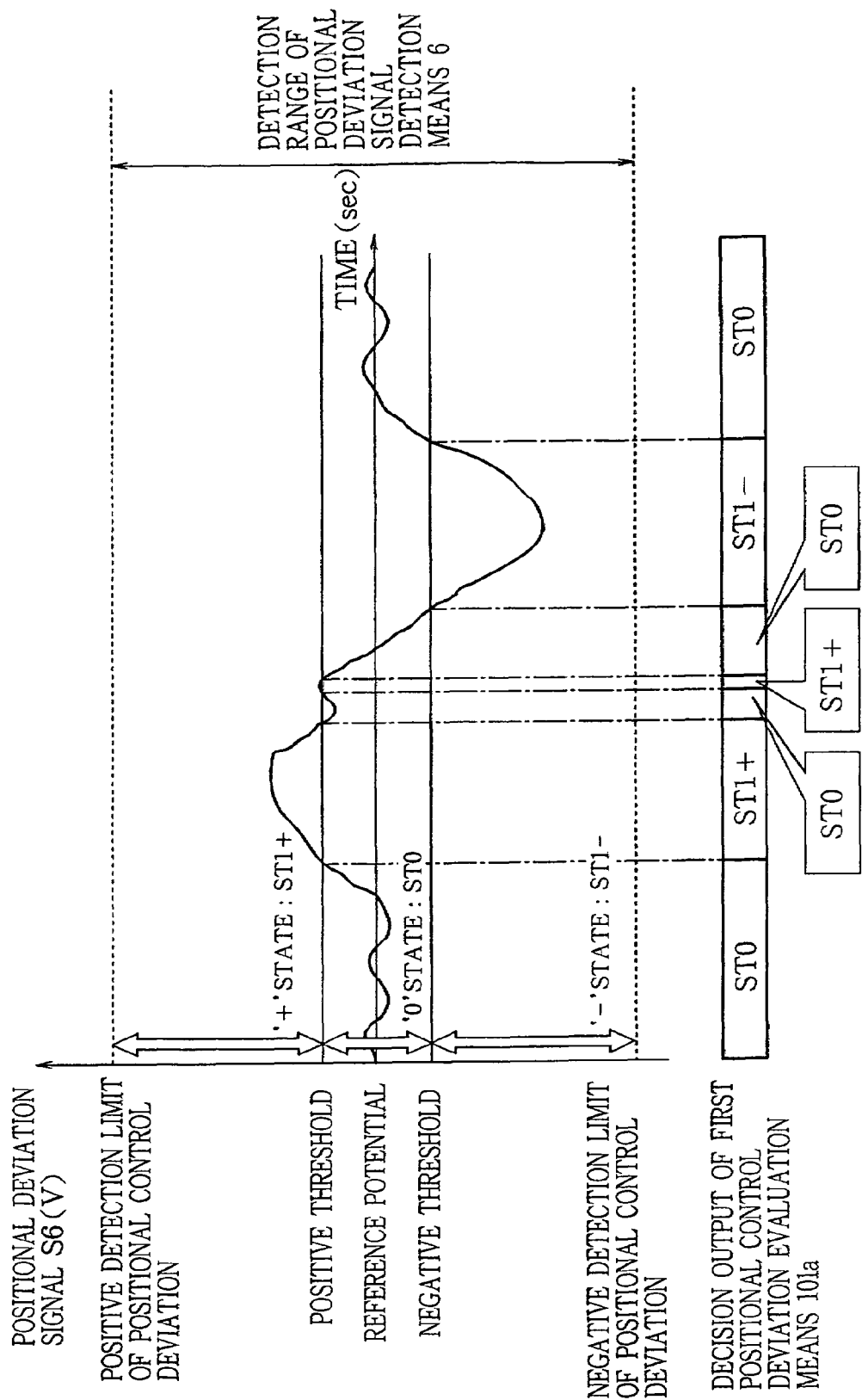
FIG. 3 illustrates operating states of the first positional control deviation evaluation means 101a in the first and second embodiments of the invention.
Figure 4:
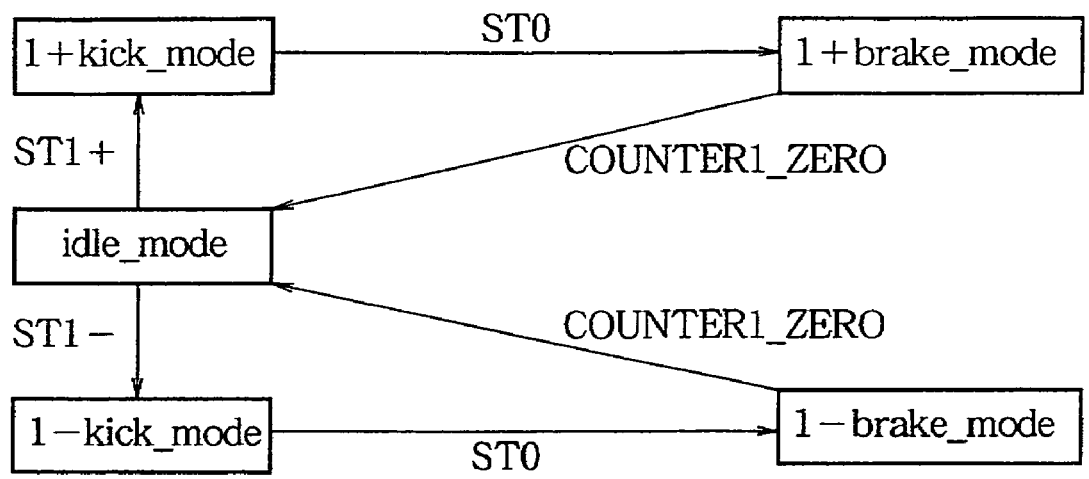
FIG. 4 is a bubble chart illustrating mode transitions of the first corrective kick and brake signal set generating means 102a in the first and second embodiments of the invention.

FIG. 3 illustrates the operating functions of the first positional control deviation evaluation means 101a, FIG. 4 is a bubble chart illustrating mode transitions of the first corrective kick and brake signal set generating means 102a, and FIG. 5 is a table illustrating the operation of the first corrective kick and brake signal set generating means 102a in each state.

FIG. 3 illustrates the operating functions of the first positional control deviation evaluation means 101a, which has the function of classifying the positional deviation signal S6, which is its input signal, into three states. The drawing shows exemplary variations of the positional deviation signal S6 over time. The first positional control deviation evaluation means 101a has a positive threshold which is set to a value that is high in relation to a reference potential (the potential at which the control deviation of the positional control system becomes zero) and a negative threshold which is set to a value that is low in relation to the reference potential. As the decision results at the bottom of FIG. 3 show, when S6 is less than the positive threshold and greater than the negative threshold, it is determined to be in a first state (referred to below as the '0' state) and a decision result 'ST0' indicating the '0' state is output. When S6 is equal to or greater than the positive threshold, it is determined to be in a second state (referred to below as the '+' state, and an 'ST1+' decision result indicating the '+' state is output. When S6 is equal to or less than the negative threshold, it is determined to be in a third state (referred to below as the '−' state, and an 'ST1−' decision result indicating the '−' state is output.

FIG. 4 is a bubble chart illustrating mode transitions of the first corrective kick and brake signal set generating means 102a. In all there are five modes; the decision result of the first positional control deviation evaluation means 101a and the count value 'COUNTER1' of an internal counter 104 are used in the transitions among these five modes. The operation of this internal counter 104 will be explained later with reference to FIG. 5, but first the mode transition operations will be described.

The initial mode is the idle mode (denoted the 'idle_mode' below). From this mode, a transition is made to the 1+ kick mode (denoted '1+kick_mode' below) if the decision result of the first positional control deviation evaluation means 101a is 'ST1+', and to the 1− kick mode (denoted '1−kick_mode' below) if the decision result of the first positional control deviation evaluation means 101a is 'ST1−'.

From the '1+kick_mode', a transition is made to the 1+ brake mode (denoted '1+brake_mode' below) if the decision result of the first positional control deviation evaluation means 101a is 'ST0'.

From the '1−kick_mode', a transition is made to the 1− brake mode (denoted '1−brake_mode' below) if the decision result of the first positional control deviation evaluation means 101a is 'ST0'.

From the '1+brake_mode', a transition is made to the 'idle_mode' when 'COUNTER1' becomes zero or less.

From the '1−brake_mode', a transition is made to the 'idle_mode' when 'COUNTER1' becomes zero or less.

FIG. 5 is a table illustrating the operation of the first corrective kick and brake signal set generating means 102a. The operation and output of the internal COUNTER1 in each transition mode is indicated. COUNTER1 is reset and initialized in the 'idle_mode', is incremented by one count per sampling period in the '1+kick_mode', and is decremented by n counts per sampling period (where n is a constant equal to or greater than 1) in the '1+brake_mode'. COUNTER1 is also incremented by one count per sampling period in the '1−kick_mode', and is decremented by n counts per sampling period (where n is a constant equal to or greater than 1) in the '1−brake_mode'.

As for the output of the first corrective kick and brake signal set generating means 102a, nothing is output in the 'idle_mode', a signal n1_out with a certain amplitude is output in the '1+kick_mode' and '1−brake_mode', and a signal −n1_out with a certain amplitude is output in the '1+brake_mode' and '1−kick_mode'.

When the amplitude of the positional deviation signal S6 exceeds a predetermined threshold (the positive threshold or the negative threshold), the above configuration enables a corrective kick signal (amplitude n1_out) for reducing the amplitude of S6 to be output forthwith until the S6 value becomes less than the threshold, and immediately after the S6 value becomes less than the threshold, a corrective brake signal with a polarity opposite to the corrective kick signal (with amplitude n1_out in this example) can be output for a predetermined time equal to or less than the time for which the corrective kick signal was applied. The function of the corrective brake signal is to reduce the positional deviation velocity, which was accelerated by the corrective kick signal, to zero; in the present embodiment, in which the corrective brake signal has the same amplitude as the corrective kick signal but the opposite polarity, it is applied for one-half the time (n=2) for which the corrective kick signal was applied.

FIGS. 6(a) and 6(b) show operating waveforms of the present invention. FIG. 6(a) is for the conventional positional control system in which the positional control deviation suppression control of the present invention is off (OFF); in FIG. 6(b), the positional control deviation suppression control of the present invention is on (ON). From top to bottom, these drawings show the applied acceleration (G), the positional deviation signal S6 (V), and the corrective kick and brake signal set S100 (V). As an example of positional control, these data are an example of focus control; the applied acceleration is applied with a frequency of 600 Hz and an amplitude of 10 G (where G is the acceleration of gravity) for the purpose of acting on the focus control system as an external disturbance; the positional deviation signal S6 represents a focus error signal. The operating sampling frequency of the inventive positional control deviation suppression control means 100 is 600 kHz. When the inventive positional control deviation suppression control is absent, a deviation of ±1 V arises with respect to the applied acceleration. The detection characteristic of the positional deviation signal detection means 6 is shown in FIG. 2. According to FIG. 2, the positional detection characteristic of the positional deviation signal detection means 6 is a nonlinear characteristic with a limited detection range in relation to the actual positional deviation; in this exemplary characteristic, the detectable range is approximately 12 microns, and the maximum output of 1 V is obtained when the deviation is approximately 6 microns. From this characteristic, it follows that the range of positional deviations that can be used in the actual control system is from −6 microns to +6 microns; outside this range, the detection accuracy of the positional deviation signal detection means 6 declines, the loop gain declines, and failures such as loss of control will occur. In the conventional example in FIG. 6(a), accordingly, as a result of the large control deviation, not only does deterioration occur in the quality of the reproduced signal and, in recording, the quality of the recorded signal; it can also be seen that the control system is in a limit condition in which failure (loss of control) occurs. When the inventive positional control deviation suppression control operates in this condition, it can be seen that the corrective kick and brake signal set S100 operates to reduce the positional deviation signal S6. As a result, the amplitude of the deviation signal can be held to about ±0.05 V. Converted to the actual amount of deviation, this is ±0.191 µm or less. This effect is operative not only in the example shown in FIGS. 6(a) and 6(b) but also for an applied acceleration with an arbitrary frequency lower than the crossover frequency of the positional control loop. Similar effects are obtained not only when the applied acceleration is an external disturbing acceleration such as vibration, but also for disc acceleration arising from a physical deformity of the disc.

Figure 7:
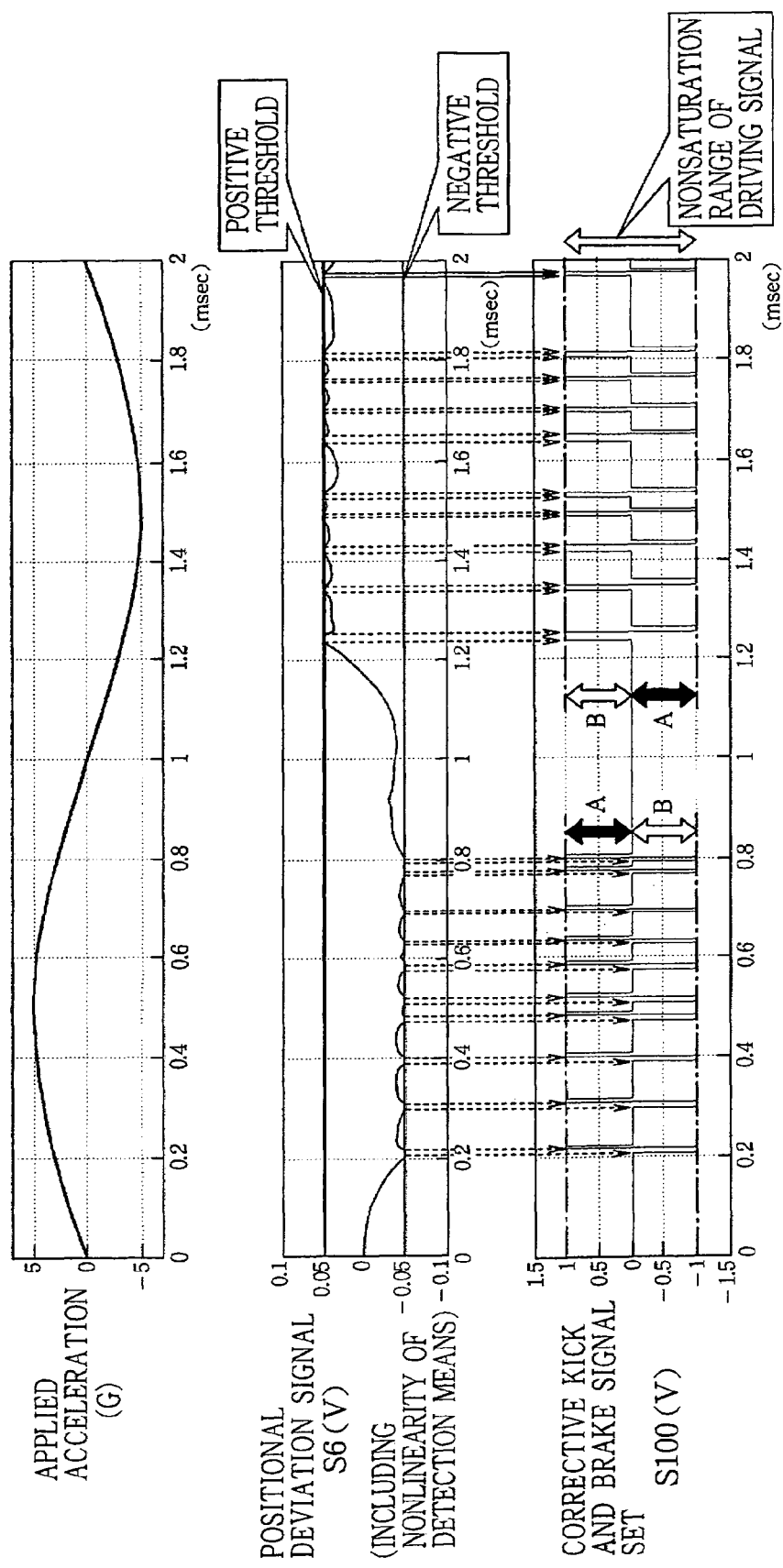
FIG. 7 illustrates operations and effects in the first embodiment of the invention.

FIG. 7 shows diagrams of the positional control deviation S6 with the data in the center of FIG. 6(b), with the vertical axis enlarged to illustrate the operation of the present invention more clearly. In the graph of the positional control deviation S6 in FIG. 7, the positive threshold and negative threshold are indicated by solid lines and the timings at which these thresholds are exceeded are indicated by dotted lines in the graph of the corrective signals at the bottom of the drawing. When the positional control deviation S6 in the center of FIG. 7 falls to or below the negative threshold, during that period, a corrective kick signal with a predetermined amplitude (B in the drawing) is output on the negative side, and it can be seen that as a result, the increase in magnitude of the positional control deviation S6 is instantly suppressed. It can also be seen that immediately after the corrective kick signal, due to the corrective brake signal which has a predetermined amplitude (A in the drawing), the positional deviation velocity, which is the derivative with respect to time of the positional deviation signal S6, becomes zero (the slope of the positional deviation signal becomes zero immediately after the corrective brake signal is applied), preventing overshoot due to the velocity arising from the corrective kick signal. When the positional control deviation S6 becomes equal to or greater than the positive threshold, during that period, a corrective kick signal with a predetermined amplitude (B in the drawing) is output on the positive side, and it can be seen that as a result, the increase in magnitude of the positional control deviation S6 is instantly suppressed. It can also be seen that immediately after the corrective kick signal, due to the corrective brake signal which has a predetermined amplitude (A in the drawing), the positional deviation velocity, which is the derivative with respect to time of the positional deviation signal S6, becomes zero (the slope of the positional deviation signal becomes zero immediately after the corrective brake signal is applied), preventing overshoot due to the velocity arising from the corrective kick signal. When the positional control deviation S6 is between the negative threshold and the positive threshold, the corrective kick and brake signals S100 are not output, and the normal conventional stable positional control system operates.

Thus when the positional control deviation S6 is between the negative threshold and the positive threshold, the present invention does not function; it operates in the same way as conventional positional control. In conditions such as an excessive physical deformity of the disc or an excessive external disturbance that could not be handled by the conventional positional control system, resulting in an increase in the positional control deviation S6, when and only when the positional control deviation exceeds one of the thresholds, the control deviation suppression control of the present invention functions by applying a corrective kick signal to keep the positional control deviation within the threshold, then immediately after the corrective kick signal, applying a corrective brake signal to reduce the positional deviation velocity due to the corrective kick signal to zero, operating so that the positional control deviation S6 is stabilized within the threshold. Consequently, even in conditions that could not be handled by conventional positional control systems, such as an excessive physical deformity of the disc or an excessive external disturbance, according to the present invention, it is possible to prevent an increase in the positional deviation and achieve stable recording and reproduction.

FIGS. 8(a) and 8(b) present the results of an analysis of a simulated shock acceleration of the type arising when the disc apparatus strikes a rigid external object, that was carried out to investigate the behavior of the positional control deviation when this type of shock was applied. FIG. 8(a) shows the temporal behavior of a conventional positional control system when the shock is applied; FIG. 8(b) shows the temporal behavior of the present invention when the shock is applied. (The operating sampling frequency is 600 kHz.) From top to bottom, the drawings show the applied acceleration (G), the positional deviation signal S6 (V), the actual positional control deviation (m), and the corrective kick and brake signal set S100 (V). The exemplary acceleration applied in this analysis was set as a square wave with an amplitude of 200 G and a temporal width of 20 μsec; the positional control system is assumed to be a focus control system. In a conventional positional control system, the positional control deviation increases due to the applied shock, and the system can be seen to go out of control because the deviation exceeds the detection limit of the positional control deviation detection system. As shown in FIG. 8(b), with the same applied acceleration conditions as in FIG. 8(a), when control deviation suppression control is carried out according to the first embodiment, or first alternative embodiment, of the invention, the positional deviation after the shock is applied is less than in the conventional case and remains within the detection limit of the positional control deviation detection system.

Accordingly, in conditions of large external disturbing acceleration due to shock, which could not be controlled by the conventional positional control system, the inventive control deviation suppression control functions to hold the positional control deviation within the detection limit of the positional deviation detection system. Consequently, even when an external shock disturbance is applied which the conventional positional control system would be unable to suppress, the present invention is able to keep the positional deviation from increasing and to achieve stable recording and reproduction. In this description, the positional control deviation suppression control means 100 had the exemplary configuration shown in FIGS. 3 to 5, but the invention is not limited to this configuration. It will be appreciated that any configuration or means may be employed, provided a similar form of output is obtained.

Second Embodiment

In the exemplary first embodiments a comparatively high frequency of 600 kHz was selected as the operating sampling frequency of the positional control deviation suppression control means 100. When the inventive function is implemented in a hard-logic circuit of an LSI control chip, a sampling frequency of 600 kHz is a value well within the realm of feasibility, but when the inventive function is implemented as firmware in a general-purpose microcontroller, the sampling frequency will often be limited to about 100 kHz. In the second embodiment, a configuration will be described that is effective even when the sampling frequency of the positional control deviation suppression control means 100 is set to a low value.

Figure 9:
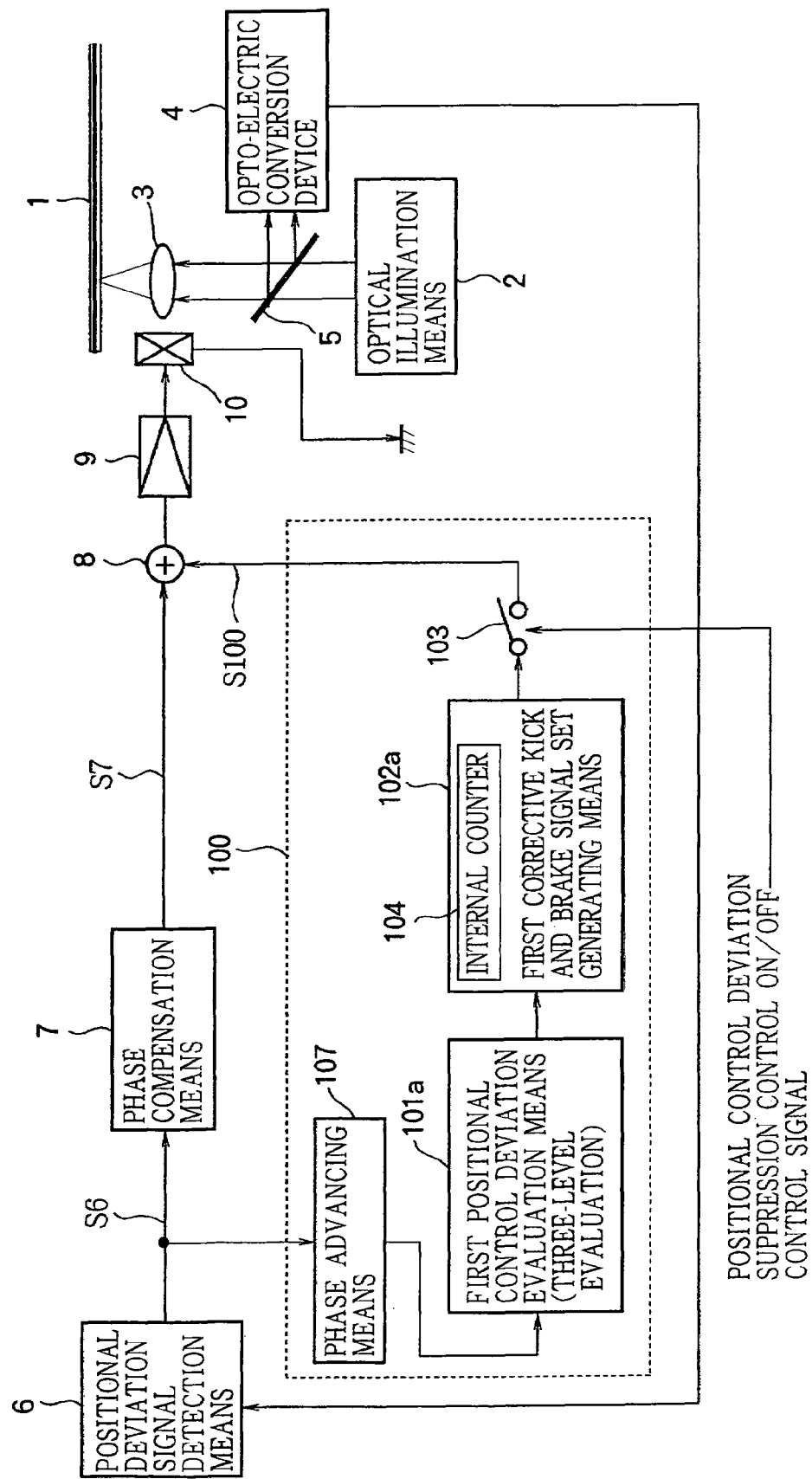
FIG. 9 is a block diagram of the second embodiment of the invention.

FIG. 9 is a block diagram of the second embodiment of the invention, in which the sampling frequency of the positional control deviation suppression control means 100 is set to a low value. The input signal of the positional control deviation suppression control means 100 is the positional deviation signal S6, and its output signal is the corrective kick and brake signal set S100. The positional deviation signal S6, which is the input signal, is converted to digital data at a predetermined sampling period by an A/D conversion means with a predetermined quantization resolution (provided, for example, at the input terminal of the positional control deviation suppression control means 100, but not shown in the drawing), and a phase advancing means 107 compensates for the temporal delay of the converted data due to the conversion. Descriptions of functional blocks 101 to 103 will be omitted since they have the same functions as described in the first embodiments.

Figure 10:
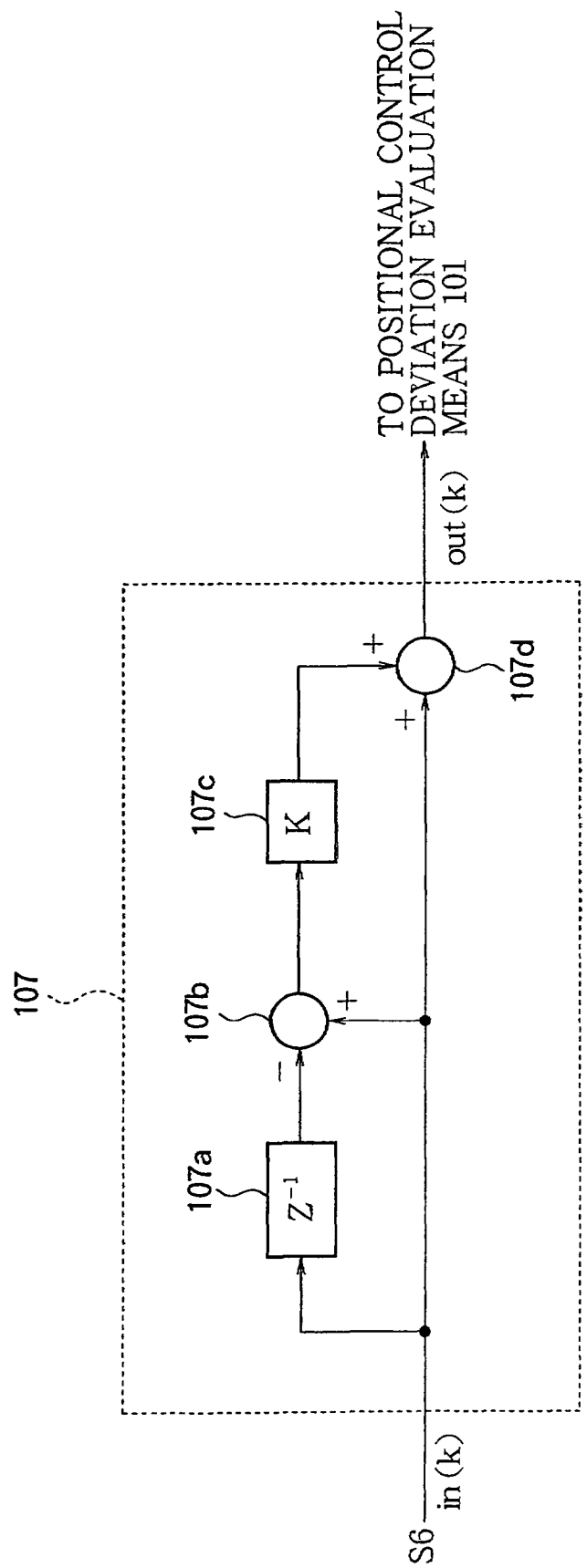
FIG. 10 is a block diagram illustrating the phase advancing means 107 in the invention.

In brief, to compensate for the temporal delay due to sampling in the positional control deviation suppression control means 100 in the first embodiments, a phase advancing means 107 is newly added in the second embodiment. As one example of an implementation of the phase advancing means 107, FIG. 10 shows an example using predictive holding. If IN(k) is defined as the input of the phase advancing means 107, OUT(k) is defined as the output, and K is defined as a temporal prediction coefficient, then if the phase advancing means 107 performs predictive holding, the phase advancing means 107 can be formulated as follows.

$$out(k) = in(k) + K\{in(k) - in(k-1)\}$$

(where out(k) is the output, in(k) is the input, k is an arbitrary natural number, and K is the temporal predictive coefficient).

The above calculation is iterated at each sampling timing, whereby the phase of the input signal is advanced in the output.

The constituent elements in FIG. 10 are as follows. The positional control deviation S6, which has been converted to digital data output from the A/D conversion means (not shown), is the input signal; the input signal is input to a shift register 107a, to the minuend side of a subtracting means 107b, and to an adding means 107d. The output of the shift register 107a is input to the subtrahend side of the subtracting means 107b; the output of the subtracting means 107b is multiplied by the temporal prediction coefficient in an amplifying means 107c and input to the adding means 107d. The output of the adding means 107d is the output of the phase advancing means 107.

Figure 11:
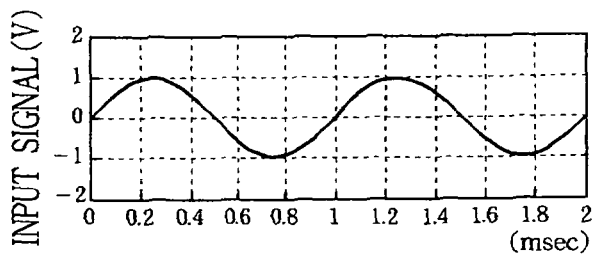
FIGS. 11(a) to 11(e) illustrate effects of the phase advancing means 107 in the invention.
Figure 11:
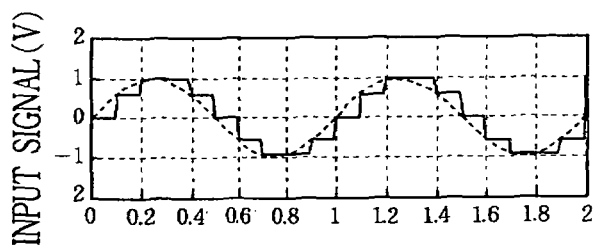
Figure 11:
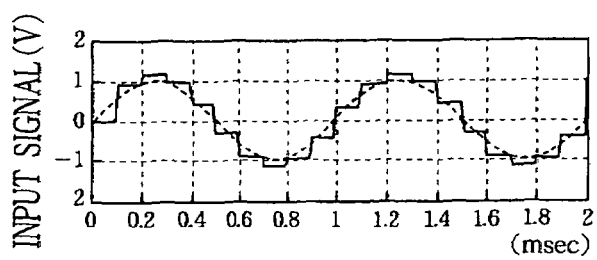
Figure 11:
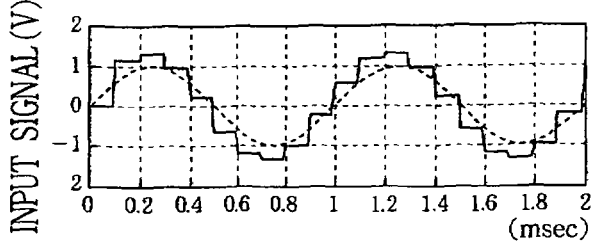
Figure 11:
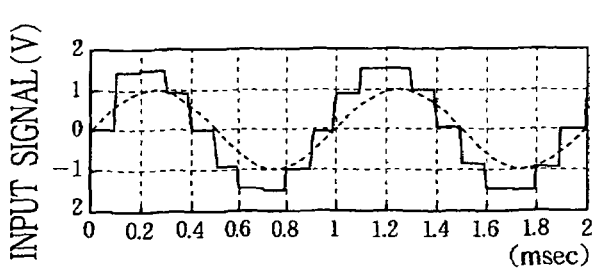

FIGS. 11(a) to 11(e) show data that illustrate the effect of the phase advancing means 107. The sampling frequency for these exemplary data is 10 kHz. FIG. 11(a) shows the input signal of the control deviation suppression control means 100, which is the input of the A/D conversion means, that is, the positional deviation S6. FIG. 11(b) is the waveform when the temporal prediction coefficient is zero, that is, when the phase advancing means 107 is not permitted to function and is ignored. FIG. 11(c), FIG. 11(d), and FIG. 11(e) are waveforms in which the temporal prediction coefficient is set to 0.5, 1.0, and 1.5, respectively. The input signal is shown by a dotted line in FIG. 11(b) to FIG. 11(e) for comparison. In FIG. 11(b), the input signal undergoes a zero-order hold due to A/D conversion, so the phase of the output signal is delayed from the phase of the input signal by about one-half sampling period, but in FIG. 11(c), the above phase delay is removed. In FIG. 11(d) and FIG. 11(e) the temporal prediction coefficient is too large, the phase is advanced from the phase of the input signal, and the amplitude is also increased. It will thus be appreciated that the temporal prediction coefficient should be set to the optimal value for the sampling frequency of the system in which it will be applied.

FIGS. 12(a) and 12(b) show operating waveforms of the invention. FIGS. 12(a) and 12(b) present the results of an analysis of a simulated shock acceleration of the type arising when the optical disc apparatus strikes a rigid external object, that was carried out to investigate the behavior of the positional control deviation when this type of shock was applied. The shock has a pseudo-impulse waveform, providing external disturbance application conditions in all bands, so the frequency component in which the control loop to which the external disturbance is applied is weakest appears as a residual deviation. It is accordingly convenient to use the shock response to evaluate the stability with respect to external disturbances. FIG. 12(a) shows the temporal behavior of the system configuration of the first embodiments when the operating sampling frequency of the positional control deviation suppression control means 100 is set to 100 kHz; FIG. 12(*b*) shows the temporal behavior of the second embodiment (K=0.5) of the present invention when the shock is applied. From top to bottom, the drawings show the applied acceleration (G), the positional deviation signal S6 (V), the actual positional control deviation (m), and the corrective kick and brake signal set S100 (V). The exemplary conditions in this analysis were the same as in FIGS. 8(*a*) and 8(*b*) in the first embodiments: the applied acceleration was set as a square wave with an amplitude of 200 G and a temporal width of 20 μsec; the positional control system is assumed to be a focus control system. In the system of the first embodiments, the positional control deviation S6 oscillates due to the applied shock, and the system can be seen to go out of control because the deviation exceeds the detection limit of the positional control deviation detection system. As shown in FIG. 12(*b*), with the same applied acceleration conditions as in FIG. 12(*a*), when control deviation suppression control is carried out according to the second embodiment of the invention, the positional control deviation after the shock is applied remains within the detection limit of the positional control deviation detection system and ultimately converges to zero. Accordingly, due to the effect of the phase advancing means 107, which is the functional block added in the second embodiment of the invention, even if the operating sampling frequency is reduced, the positional control deviation suppression control means 100 is able to perform stable control operations.

FIGS. 13(*a*) and 13(*b*) show operating waveforms of the second embodiment of the invention under the same conditions as FIGS. 6(*a*) and 6(*b*) in the first embodiments. The value of the temporal prediction coefficient is K=0.5. FIG. 13(*a*) is for the conventional positional control system in which the positional control deviation suppression control of the present invention is off; in FIG. 13(*b*), the positional control deviation suppression control of the present invention is on. From top to bottom, these drawings show the applied acceleration (G), the positional deviation signal S6 (V), and the corrective kick and brake signal set S100 (V). As an example of positional control, these data are an example of focus control; the applied acceleration is applied with a frequency of 600 Hz and an amplitude of 10 G (where G is the acceleration of gravity) for the purpose of acting on the focus control system as an external disturbance; the positional deviation signal S6 represents a focus error signal. The operating sampling frequency of the inventive positional control deviation suppression control means 100 is 100 kHz. When the inventive positional control deviation suppression control is absent, a deviation of ±1 V arises in the applied acceleration. FIG. 2 illustrates the detection characteristic of the positional deviation signal detection means 6. When the inventive positional control deviation suppression control operates in this condition, it can be seen that the corrective kick and brake signal set S100 operates to reduce the positional deviation signal S6. As a result, the amplitude of the deviation signal can be held to about ±0.05 V. Converted to the actual amount of deviation, this is ±0.191 μm or less. This effect is operative not only in the example shown in FIGS. 13(*a*) and 13(*b*) but also for an applied acceleration with an arbitrary frequency lower than the crossover frequency of the positional control loop. Similar effects are obtained not only when the applied acceleration is an external disturbing acceleration such as vibration, but also for disc acceleration arising from a physical deformity of the disc.

As explained above, in the second embodiment, even when the operating sampling frequency of the positional control deviation suppression control means 100 is low, the phase advancing means 107 provided in the input stage of the positional control deviation suppression control means 100 compensates for the phase delay due to sampling, and effects similar to the effects described in the first embodiments are obtained. In this description, the positional control deviation suppression control means 100 had the exemplary configuration shown in FIGS. 3 to 5 and the phase advancing means had the configuration shown in FIG. 10, but the invention is not limited to these configurations. It will be appreciated that any configuration or means may be employed, provided a similar form of output is obtained.

Third Embodiment

In the examples given in the first and second embodiments, the (position)/(driving voltage) frequency characteristic of the driving means was such that there was a phase rotation of 180 degrees in the frequency band at and above 10 kHz. The high-frequency operating characteristics of actual operating means are sometimes degraded by a second-order low-pass filter characteristic due to high-order resonance characteristics at and above 10 kHz. In the third embodiment, a configuration will be described that gives good results even when a driving means with high-frequency operating characteristics degraded by such high-order resonance is used.

FIGS. 14(*a*) and 14(*b*) show the (position)/(driving voltage) frequency characteristic of a mechanical element having a high-order resonance in the driving means. In both FIGS. 14(*a*) and 14(*b*), the presence of high-order resonance can be seen in the frequency band at and above 10 kHz. FIG. 14(*a*) is a characteristic of the type in which there is an anti-resonance in the band between the primary resonance and the high-order resonance; FIG. 14(*b*) is a characteristic without such an anti-resonance. These types will be referred to as the anti-resonance type (FIG. 14(*a*)) and the forward resonance type (FIG. 14(*b*)).

In the anti-resonance type, the gain and phase characteristics are only locally distorted in the vicinity of the high-order resonance frequency; in the frequency band above the high-order resonance, the characteristics are the same as if the high-order resonance were not present. The dynamic characteristics are accordingly substantially the same as those of an ideal driving means without high-order resonance, and high-speed operation is possible without degradation in the band at and above 10 kHz. In the forward resonance type, however, the characteristic in the band above the high-order resonance frequency is the characteristic of a second-order LPF connected in series with the characteristic of the ideal driving means. The dynamic characteristics are therefore greatly degraded in the band above the high-order resonance, and high-speed driving is impossible.

When a driving means of the forward resonance type is used, since the loop band in the conventional positional control system is set below the high-order resonance, it does not cause problems, but in the present invention, the function of which is realized by driving the driving means at high speed by corrective kick and brake signals of the impulse type, this becomes a major cause of degraded performance.

Figure 8:
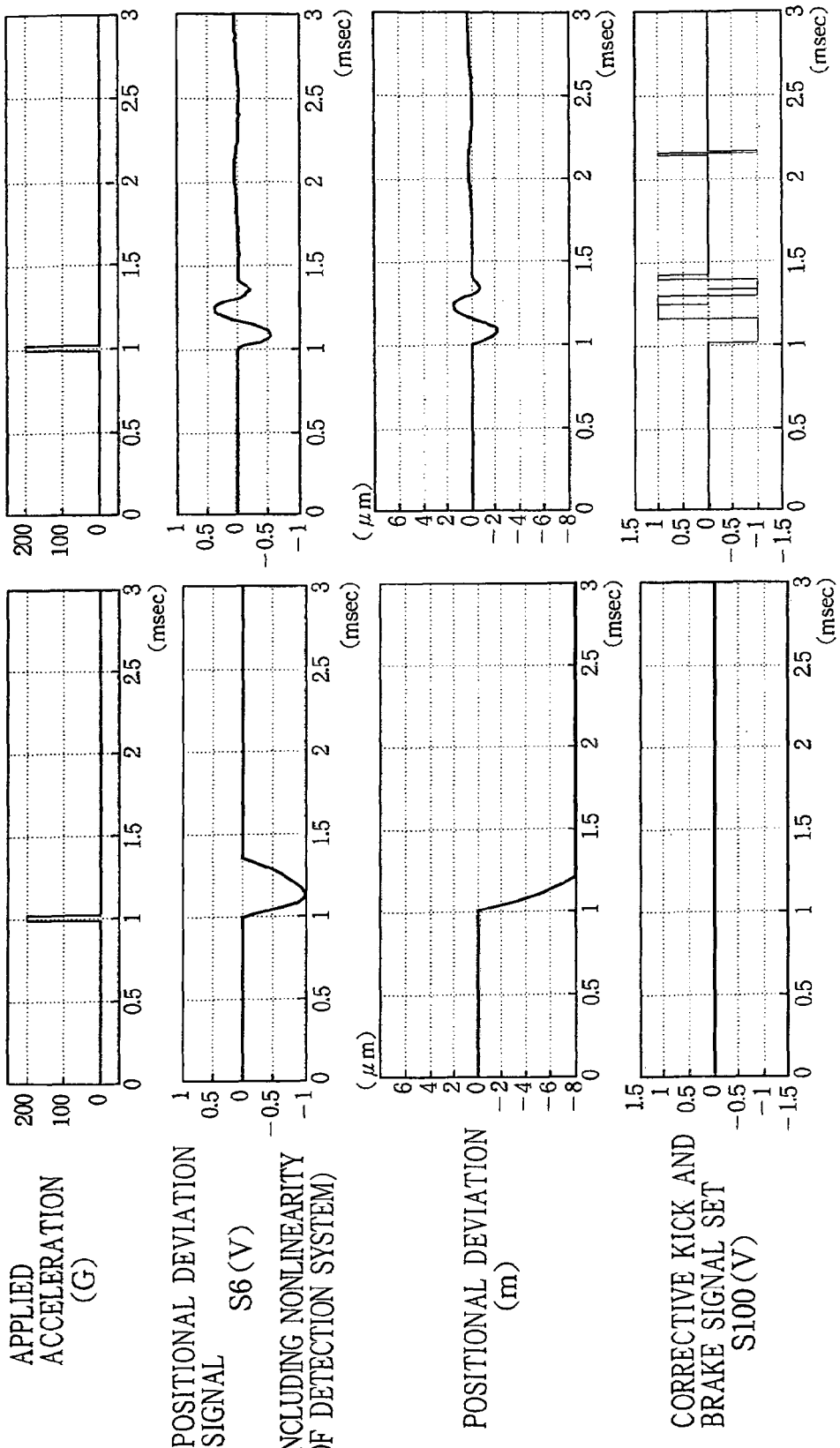
FIGS. 8(a) and 8(b) illustrate effects in the first embodiment of the invention.

FIGS. 15(*a*) and 15(*b*) show the results when a driving means of the forward resonance type shown in FIG. 14(*b*) is used under the same conditions as shown in FIG. 8(*b*) in the first embodiments. When the driving means is of the anti-resonance type, the results are similar to FIG. 8(*b*), but for the forward resonance type, after the external shock disturbance is applied, as shown in FIG. 15(*a*), the positional deviation fails to converge, and oscillation occurs. The cause is a temporal delay that arises at high frequencies due to the frequency characteristics of the driving means. The oscillation occurs because of over-control of the corrective kick and brake signal set S100, which causes hunting to occur; this can be prevented by setting the corrective kick and brake signal set S100 to a lower amplitude. FIG. 15(b) shown the result when the absolute value of the amplitude of the corrective kick and brake signal set S100 is set to 0.64 V, which is 64% of the value in FIG. 15(a). The oscillation disappears and stable convergence takes place, but the amount of positional deviation after the shock is applied is from 2.1 µm to 4 µm, which is much larger than in FIG. 8(b). Accordingly, when a driving means of the forward resonance type is used, there is the problem that since the amplitude of the corrective kick and brake signal set S100 is more limited than for the anti-resonance type, the positional control deviation suppression effect is degraded. The purpose of the third embodiment of the invention is to achieve a configuration in which the degradation of the positional control deviation suppression effect is small, even if a driving means of the forward resonance type is used.

FIG. 16 is a block diagram of the third embodiment of the invention. The first positional control deviation evaluation means 101a of the first embodiments of the invention is replaced by a second positional control deviation evaluation means 101b, and the first corrective kick and brake signal set generating means 102a is replaced by a second corrective kick and brake signal set generating means 102b. Descriptions of the other functional blocks will be omitted, since they have the same functions as described in the first embodiments.

FIG. 17 illustrates the operational function of the second positional control deviation evaluation means 101b, which has the function of classifying the positional deviation signal S6, which is its input signal, into five states. The drawing shows an example of the variations of the positional deviation signal S6 over time. The second positional control deviation evaluation means 101b has a first positive threshold (referred to below as positive threshold-1) which is set to a value that is high in relation to a reference potential (the potential at which the control deviation of the positional control system becomes zero), a second positive threshold (referred to below as positive threshold-2) which is set to a value higher than positive threshold-1, a first negative threshold (referred to below as negative threshold-1) which is set to a value that is low in relation to the reference potential, and a second negative threshold (referred to below as negative threshold-2) which is set to a value lower than negative threshold-1. As the decision results at the bottom of FIG. 17 show, when S6 is less than positive threshold-1 and greater than negative threshold-1, it is determined to be in a first state (referred to below as the '0' state) and a decision result 'ST0' indicating the '0' state is output. When S6 is equal to or greater than positive threshold-1 and less than positive threshold-2, it is determined to be in a second state (referred to below as the '+' state, and an 'ST1+' decision result indicating the '+' state is output. When S6 is equal to or less than negative threshold-1 and greater than negative threshold-2, it is determined to be in a third state (referred to below as the '−' state, and an 'ST1−' decision result indicating the '−' state is output. When S6 is equal to or greater than positive threshold-2, it is determined to be in a fourth state (referred to below as the '++' state, and an 'ST2+' decision result indicating the '++' state is output. When S6 is equal to or less than negative threshold-2, it is determined to be in a fifth state (referred to below as the '−−' state, and an 'ST2−' decision result indicating the '−−' state is output.

Figure 18:
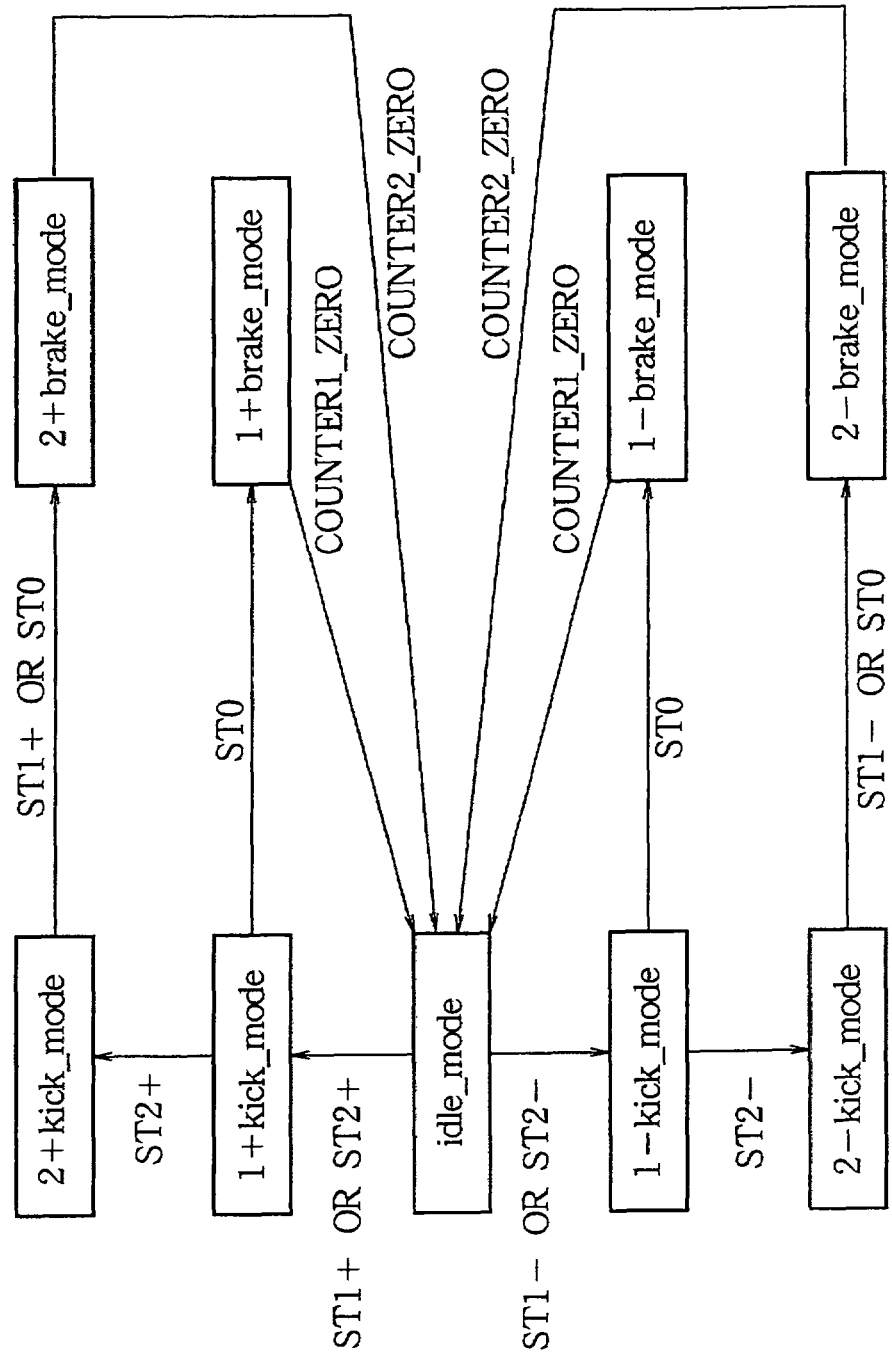
FIG. 18 is a bubble chart illustrating mode transitions of the second corrective kick and brake signal set generating means 102b in the third and fourth embodiments of the invention.

FIG. 18 is a bubble chart illustrating mode transitions of the second corrective kick and brake signal set generating means 102b. In all there are nine modes; the decision result of the second positional control deviation evaluation means 101b, the count value 'COUNTER1' of a first internal counter 104, and the count value 'COUNTER2' of a second internal counter 105 are used in the transitions among these nine modes. The operation of the first and second internal counters 104, 105 will be explained later with reference to FIG. 19, but first the mode transition operations will be described.

The initial mode is the 'idle_mode'. From this mode, a transition is made to the '1+kick_mode' if the decision result of the second positional control deviation evaluation means 101b is 'ST1+' of 'ST2+', and to the '1−kick_mode' if the decision result of the first positional control deviation evaluation means 101a is 'ST1−' or 'ST2−'.

From the '1+kick_mode', a transition is made to the '1+brake_mode' if the decision result of the second positional control deviation evaluation means 101b is 'ST0', and to a 2+ kick mode (denoted the '2+kick_mode' below) if the decision result is 'ST2+'.

From the '2+kick_mode', a transition is made to a 2+ brake mode (denoted the '2+brake_mode' below' if the decision result of the second positional control deviation evaluation means 101b is 'ST1+' or 'ST0'.

From the '1−kick_mode', a transition is made to the '1−brake_mode' if the decision result of the second positional control deviation evaluation means 101b is 'ST0', and to a 2− kick mode (denoted the '2−kick_mode' below) if the decision result is 'ST2−'.

From the '2−kick_mode', a transition is made to a 2− brake mode (denoted the '2−brake_mode' below' if the decision result of the second positional control deviation evaluation means 101b is 'ST1−' or 'ST0'.

From the '1+brake_mode', a transition is made to the 'idle_mode' when 'COUNTER1' becomes zero or less.

From the '2+brake_mode', a transition is made to the 'idle_mode' when 'COUNTER2' becomes zero or less.

From the '1−brake_mode', a transition is made to the 'idle_mode' when 'COUNTER1' becomes zero or less.

From the '2−brake_mode', a transition is made to the 'idle_mode' when 'COUNTER2' becomes zero or less.

FIG. 19 is a table illustrating the operation of the second corrective kick and brake signal set generating means 102b. The operation and output of the internal COUNTER1 and internal COUNTER2 in each transition mode are indicated. COUNTER1 is reset and initialized in the 'idle_mode', '2+kick_mode', '2+brake_mode', '2−kick_mode', and '2−brake_mode', is incremented by one count per sampling period in the '1+kick_mode' and '1−kick_mode', and is decremented by n counts per sampling period (where n is a constant equal to or greater than 1) in the '1+brake_mode' and '1−brake_mode'.

COUNTER2 is reset and initialized in the 'idle_mode', '1+kick_mode', '1+brake_mode', '1−kick_mode', and '1−brake_mode', is incremented by one count per sampling period in the '2+kick_mode' and '2−kick_mode', and is decremented by n counts per sampling period (where n is a constant equal to or greater than 1) in the '2+brake_mode' and '2−brake_mode'.

As for the output of the second corrective kick and brake signal set generating means 102b, nothing is output in the 'idle_mode', the certain amplitude n1_out is output in the '1+kick_mode' and '1−brake_mode', and −n1_out is output in the '1+brake_mode' and '1−kick_mode'. In addition, the certain amplitude n1_out*B is output in the '2+kick_mode' and '2−brake_mode', and −n1_out*B is output in the '2+brake_mode' and '2−kick_mode'. B is a constant equal to or greater than one.

When the amplitude of the positional deviation signal S6 exceeds a predetermined threshold (positive threshold-1 or negative threshold-1), the above configuration enables a first corrective kick signal (amplitude n1_out) for reducing the amplitude of S6 to be output forthwith until the S6 value becomes less than the threshold, and immediately after the S6 value becomes less than the threshold, a first corrective brake signal with a polarity opposite to the first corrective kick signal (with amplitude n1_out in this example) can be output for a predetermined time equal to or less than the time for which the first corrective kick signal was applied. The function of the first corrective brake signal is to reduce the positional deviation velocity, which was accelerated by the first corrective kick signal, to zero; in the present embodiment, in which the first corrective brake signal has the same amplitude as the first corrective kick signal but the opposite polarity, it is applied for 1/n-th of time (½ the time if n=2) for which the first corrective kick signal was applied. The operations so far are the same as in the first embodiments, but the addition of the following function compensates for the degradation of high-frequency characteristics of the driving means etc.

When the amplitude of the positional deviation signal S6 exceeds a predetermined threshold (positive threshold-2 or negative threshold-2), the above configuration enables a second corrective kick signal (amplitude n1_out*B) for reducing the amplitude of S6 to be output forthwith until the S6 value becomes less than the threshold. Since B is a constant equal to or greater than one, when the amplitude of S6 is large, it is dealt with by a correspondingly large second corrective kick signal, which can prevent the amplitude of S6 from becoming any larger. Of course, if B is equal to one, the operation is the same as in the first embodiments. Immediately after the S6 value becomes less than the threshold, a second corrective brake signal with a polarity opposite to the second corrective kick signal (with amplitude n1_out*B in this example) can be output for a predetermined time equal to or less than the time for which the second corrective kick signal was applied. The function of the second corrective brake signal is to reduce the positional deviation velocity, which was accelerated by the second corrective kick signal, to zero; in the present embodiment, in which the second corrective brake signal has the same amplitude as the second corrective kick signal but the opposite polarity, it is applied for 1/n-th of time (½ the time if n=2) for which the second corrective kick signal was applied. An additional function of the second brake signal is to enable the transition to the braking process to start earlier than in the first embodiments. In the first embodiments, the phase rotates in the band at and above 10 kHz due to degradation of the high-frequency characteristics of the driving means, which is the object being controlled, and motion becomes more difficult. Accordingly, even if pulse-type driving is considered, a temporal delay arises in the high-frequency band, so the braking timing is delayed, and the so-called hunting state may ensue. In the present embodiment, since the second brake signal operates at an earlier timing than the first brake signal, the operation can be made more stable than in the first embodiments.

FIGS. 20(a) and 20(b) show operating waveforms of the third embodiment. FIGS. 20(a) and 20(b) are the result of an investigation of the behavior of the positional control deviation under the same conditions of applied acceleration as in FIGS. 15(a) and 15(b). FIG. 20(a) shows the behavior in the same configuration as in FIG. 1, that is, the same configuration as in the first embodiments (except that the amplitudes n1_out and −n1_out of the corrective kick and brake signal set S100 are 64% of the amplitude in the first embodiments); the waveforms are the same as in FIG. 15(b). FIG. 20(b) shows the behavior of the third embodiment of the invention under the same conditions of applied acceleration. The amplitude of the corrective kick and brake signals has an absolute value of 0.64 V in FIG. 20(a) as described above; in FIG. 20(b), the absolute value of the amplitude of the first set of corrective kick and brake signals is 0.44 V, and the absolute value of the amplitude of the second set of corrective kick and brake signals is 0.88 V. It can be seen that since the amplitude of the absolute value of the amplitude of the corrective kick and brake signal set can be set to a greater value than in FIG. 20(a), the consequent value of the positional control deviation S6 after the applied shock is less than in FIG. 20(a).

FIGS. 21(a) and FIG. 21(b) show operating waveforms of the third embodiment of the invention for the same conditions as FIGS. 6(a) and 6(b) in the first embodiments of the invention. The driving means has a forward resonance characteristic as in FIG. 14(b). In FIG. 21(a) the positional control system of the first embodiments of the invention is used; in FIG. 21(b) the positional control deviation suppression control of the third embodiment of the invention is turned on. From top to bottom, these drawings show the applied acceleration (G), the positional deviation signal S6 (V), and the corrective kick and brake signal set S100 (V). As an example of positional control, these data are an example of focus control; the applied acceleration is applied with a frequency of 600 Hz and an amplitude of 10 G (where G is the acceleration of gravity) for the purpose of acting on the focus control system as an external disturbance; the positional deviation signal S6 represents a focus error signal. The operating sampling frequency of the inventive positional control deviation suppression control means 100 is 600 kHz. Under the positional control deviation suppression control of the first embodiments of the invention, a positional deviation of ±0.3 V arises with respect to the applied acceleration. If the positional control deviation suppression control of the third embodiment of the invention operates in this condition, it can be seen that the four-valued corrective kick and brake signal set S100 operates to reduce the positional deviation signal S6. As a result, the amplitude of the deviation signal can be held to about ±0.25 V. Converted to the actual amount of deviation, this is ±0.955 μm or less. This effect is operative not only in the example shown in FIGS. 21(a) and 21(b) but also for an applied acceleration with an arbitrary frequency lower than the crossover frequency of the positional control loop. Similar effects are obtained not only when the applied acceleration is an external disturbing acceleration such as vibration, but also for disc acceleration arising from a physical deformity of the disc.

As explained above, in the third embodiment, even when the driving means has a high-order resonance characteristic of the forward resonance type that makes high-speed operation difficult, since the positional control deviation evaluation means and the corrective kick and brake signal set generating means is provided with five-level evaluation and four-valued control, instead of the three-level evaluation and two-valued control of the first embodiments, the effect of preventing degraded performance due to phase delay in the driving means is obtained. In this description, the positional control deviation suppression control means 100 had the exemplary configuration shown in FIGS. 17 to 19, but the invention is not limited to these configurations. It will be appreciated that any configuration or means may be employed, provided the same form of output as described above is obtained.

Fourth Embodiment

In the third embodiment, the driving means had an exemplary configuration that made high-speed operation difficult, but a comparatively high operating sampling frequency of 600 kHz was selected for the positional control deviation suppression control means 100. When the inventive function is implemented in a hard-logic circuit of an LSI control chip, a sampling frequency of 600 kHz is a value well within the realm of feasibility, but when the inventive function is implemented as firmware in a general-purpose microcontroller, the sampling frequency will often be limited to about 100 kHz. In the fourth embodiment, the same driving means is used as in the third embodiment, and in addition, a configuration from which effects can be obtained even when the sampling frequency of the positional control deviation suppression control means 100 is set to a low value will be described.

Figure 22:
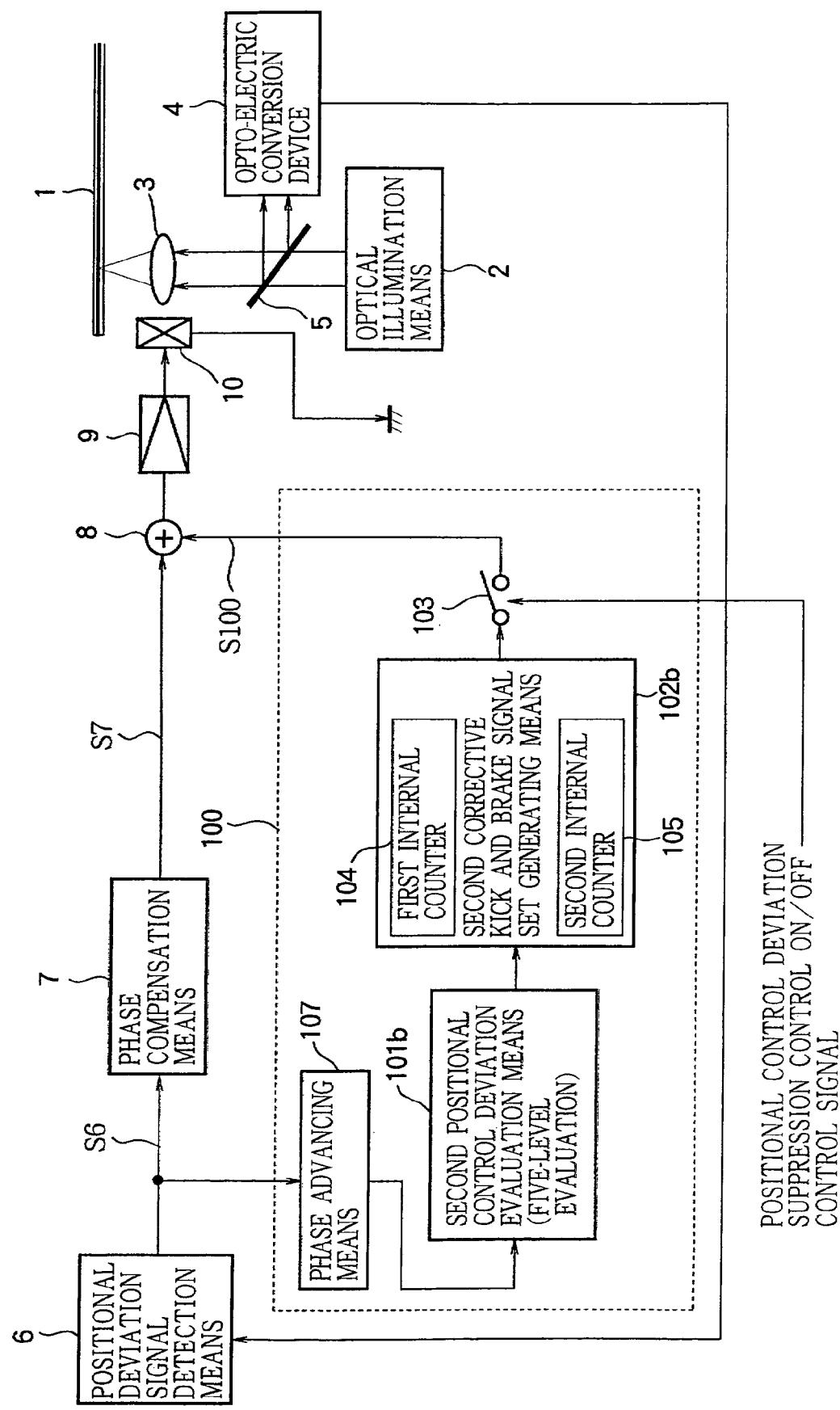
FIG. 22 is a block diagram of a fourth embodiment of the invention.

FIG. 22 is a block diagram of the fourth embodiment of the invention, in which a driving means with a configuration that makes high-speed operation difficult is used, and the sampling frequency of the positional control deviation suppression control means 100 is set to a low value. The positional deviation signal S6, which is the input signal, is converted to digital data at a predetermined sampling period by an A/D conversion means (not shown) with a predetermined quantization resolution, and a phase advancing means 107 compensates for the temporal delay of the converted data due to the conversion. Descriptions of functional blocks 101 to 103 will be omitted since they have the same functions as described in the third embodiment.

In brief, the fourth embodiment has a structure that adds the phase advancing means 107 newly shown in the second embodiment to compensate for the temporal delay due to the sampling in the control deviation suppression control means 100 in the third embodiment. A description of the structure, operation, and functions of the phase advancing means 107 will be omitted since they are the same as in the second embodiment.

FIGS. 23(a) and 23(b) show operating waveforms of the fourth embodiment of the invention. FIGS. 23(a) and 23(b) are the result of an investigation of the behavior of the positional control deviation under the same conditions of applied acceleration as in FIGS. 20(a) and 20(b). FIG. 23(a) shows the behavior in the same configuration as in FIG. 16, that is, the same configuration as in the third embodiment. FIG. 23(b) shows the behavior of the fourth embodiment of the invention under the same conditions of applied acceleration. FIG. 23(b) shows the temporal behavior due to the temporal prediction coefficient (K=1.2) of the present invention when shock is applied. From top to bottom, these drawings show the applied acceleration (G), the positional deviation signal S6 (V), the actual positional control deviation (m), and the corrective kick and brake signal set S100 (V). The exemplary conditions in the analysis are the same as in FIGS. 20(a) and 20(b) in the third embodiment; the applied acceleration in this analysis is set as a square wave with an amplitude of 200 G and a temporal width of 20 μsec; the control system is assumed to be a focus control system. In the system in the third embodiment, the positional control deviation S6 oscillates due to the applied shock, and the system can be seen to go out of control because the deviation exceeds the detection limit of the positional control deviation detection system. As shown in FIG. 23(b), with the same applied acceleration conditions as in FIG. 23(a), when control deviation suppression control is carried out according to the fourth embodiment of the invention, the positional control deviation after the shock is applied remains within the detection limit of the positional control deviation detection system and ultimately converges to zero. Accordingly, due to the effect of the phase advancing means 107, which is the functional block added in the fourth embodiment of the invention, even if the operating sampling frequency is reduced, the positional control deviation suppression control means 100 is able to perform stable control operations.

FIGS. 24(a) and 24(b) show operating waveforms of the second embodiment of the invention under the same conditions as FIGS. 21(a) and 21(b) in the third embodiment. The value of the temporal prediction coefficient is K=1.2. FIG. 24(a) is for the positional control system of the third embodiment; in FIG. 24(b), the positional control deviation suppression control of the fourth embodiment of the present invention is turned on. From top to bottom, these drawings show the applied acceleration (G), the positional deviation signal S6 (V), and the corrective kick and brake signal set S100 (V). As an example of positional control, these data are an example of focus control; the applied acceleration is applied with a frequency of 600 Hz and an amplitude of 10 G (where G is the acceleration of gravity) for the purpose of acting on the focus control system as an external disturbance; the positional deviation signal S6 represents a focus error signal. The operating sampling frequency of the inventive positional control deviation suppression control means 100 is 100 kHz. When the positional control deviation suppression control means 100 is 600 kHz in the diagrams on the right and 100 kHz in the diagrams on the left. In the fourth embodiment of the invention, although the operating sampling frequency is set lower than in the third embodiment in the diagrams on the left, the amplitude of the deviation signal can be held to about the same value of ±0.25 V. Converted to the actual amount of deviation, this is ±0.955 μm or less. This effect is operative not only in the example shown in FIGS. 24(a) and 24(b) but also for an applied acceleration with an arbitrary frequency lower than the crossover frequency of the positional control loop. Similar effects are obtained not only when the applied acceleration is an external disturbing acceleration such as vibration, but also for disc acceleration arising from a physical deformity of the disc.

As explained above, in the fourth embodiment, the same driving means is used as in the third embodiment, and even when the operating sampling frequency of the positional control deviation suppression control means 100 is low, the phase advancing means 107 provided in the input stage of the positional control deviation suppression control means 100 compensates for the phase delay due to sampling, so effects similar to the effects described in the third embodiment are obtained. In this description, the positional control deviation suppression control means 100 had the exemplary configuration shown in FIGS. 17 to 19 and the phase advancing means had the configuration shown in FIG. 10, but the invention is not limited to these configurations. It will be appreciated that any configuration or means may be employed, provided a similar form of output is obtained.

INDUSTRIAL APPLICABILITY

The present invention is applicable not only to the control of the optical pick-up of an optical disc, but also to other apparatus such as tracking control apparatus for a hard disc device.

What is claimed is:
1. An optical disc device comprising:
an optical illumination means for emitting light to form a light spot on an optical disc;
a driving means for performing predetermined operations on an objective lens in relation to the optical disc, based on a driving control signal;

an opto-electric conversion means for detecting reflected light information related to light reflected from the optical disc;

a positional deviation signal detection means for detecting a relative positional error between the objective lens and the optical disc on the basis of the reflected light information and outputting a positional deviation signal;

a control signal generating means for generating a control signal defining a control quantity in the predetermined operation, based on the positional deviation signal obtained from the positional deviation signal detection means;

a positional control deviation evaluation means for receiving the positional deviation signal as an input, evaluating the positional deviation signal from the positional deviation signal detection means by judging whether the positional deviation signal is within a predefined range, and outputting a positional control deviation evaluation result indicating a state of the positional deviation signal amplitude;

a corrective kick and brake signal set generating means for generating and outputting a corrective kick and brake signal set including a kick signal followed continuously by a brake signal for the driving means, based on an evaluation result of the positional control deviation evaluation means;

an adding means for adding the corrective kick and brake signal set and the control signal, and outputting the result of the addition; and a switching means disposed between the corrective kick and brake signal set generating means and the adding means to switch the adding of the corrective kick and brake signal set to the control signal on when the positional deviation signal is outside of the predefined range, and off when the positional deviation signal is within the predefined range, wherein the corrective kick and brake signal set generating means starts output of the kick signal when the positional deviation signal becomes outside of the predefined range, and terminates the output of the kick signal and starts the output of the brake signal when the positional deviation signal becomes within the predefined range.

2. The optical disc device of claim 1, wherein
the positional control deviation evaluation means has a positive threshold and a negative threshold as decision thresholds, these thresholds being positive and negative in relation to a reference potential of the positional deviation signal, and evaluating the positional deviation signal includes deciding the state of the amplitude of the positional deviation based on the following states:

a first state in which the amplitude is between the positive threshold and the negative threshold;

a second state in which the amplitude is equal to or greater than the positive threshold; and a third state in which the amplitude is equal to or less than the negative threshold.

3. The optical disc device of claim 2, wherein the corrective kick and brake signal set generating means receives the positional control deviation evaluation result as an input and is operable, when the decision result is the second state or the third state, to apply a corrective kick signal with a certain height, in a direction that reduces the positional control deviation represented by the positional deviation signal, to the driving means until the decision result enters the first state, remember the interval during which the second state or the third state obtained, and immediately after the first state is entered, apply a corrective brake signal having a certain height, operable to reduce the positional deviation speed to zero, to the driving means for an interval equal to or less than the remembered interval.

4. The optical disc device of claim 1, wherein the predefined range is within a range of relative positional error detection by the positional deviation signal detection means.

5. The optical disc device of claim 1, wherein the positional control deviation evaluation means evaluates the positional deviation signal on a five-point scale.

6. The optical disc device of claim 1, wherein the positional control deviation evaluation means has as decision thresholds a first positive threshold, a second positive threshold greater than the first positive threshold, a first negative threshold, and a second negative threshold less than the first negative threshold, these thresholds being positive and negative in relation to a reference potential of the positional deviation signal, and evaluating the positional deviation signal includes deciding the state of the amplitude of the positional deviation based on the following states:

a first state in which the amplitude is between the first positive threshold and the first negative threshold;

a second state in which the amplitude is equal to or greater than the first positive threshold and less than the second positive threshold;

a third state in which the amplitude is equal to or less than the first negative threshold and greater than the second negative threshold;

a fourth state in which the amplitude is equal to or greater than the second positive threshold; and a fifth state in which the amplitude is equal to or less than the second negative threshold.

7. The optical disc device of claim 6, wherein the corrective kick and brake signal set generating means receives the positional control deviation evaluation result as an input and is operable, when the decision result is the second state or the third state, to apply a corrective kick signal with a first certain height in a direction that reduces the positional control deviation represented by the positional deviation signal to the driving means until the decision result enters the first state, remember a first interval during which the second state or the third state obtained, and immediately after the first state is entered, apply a corrective brake signal having the first certain height, operable to reduce the positional deviation speed to zero, to the driving means for an interval equal to or less than the remembered first interval, and is operable, when the decision result is the fourth state or the fifth state, to apply a corrective kick signal with a second certain height set to an amplitude equal to or greater than the corrective kick signal of the first certain height in a direction that reduces the positional control deviation represented by the positional deviation signal to the driving means until the decision result enters the second state or the third state, respectively, remember a second interval during which the fourth state or the fifth state obtained, and immediately after the second state or the third state is entered, apply a corrective brake signal having the second certain height, operable to reduce the positional deviation speed to zero, to the driving means for an interval equal to or less than the remembered second interval.

8. The optical disc device of claim 1, further comprising a phase advancing means disposed preceding the positional control deviation evaluation means, operable to amplify a high-frequency component in a vicinity of a discretizing frequency of a discretized positional deviation signal.

9. The optical disc device of claim 8, wherein the phase advancing means is a predictive holding means that performs the following operation out(k)=in(k)+K{in(k)-in(k-1)}

(where out(k) is output, in(k) is input, k being an arbitrary natural number, and K is a temporal prediction coefficient).

10. A magnetic disc device comprising:
a magnetic disc;
a magnetic head for recording or reproducing information on the magnetic disc;
a driving means for performing a predetermined operation on the magnetic head in relation to the magnetic disc, based on a driving control signal;
a positional deviation signal detection means for detecting a relative positional error between the magnetic head and the magnetic disc on the basis of information obtained from the magnetic disc and outputting a positional deviation signal;
a control signal generating means for generating a control signal defining a control quantity in the predetermined operation, based on the positional deviation signal obtained from the positional deviation signal detection means;
a positional control deviation evaluation means for receiving the positional deviation signal as an input, evaluating the positional deviation signal from the positional deviation signal detection means by judging whether the positional deviation signal is within a predefined range, and outputting a positional control deviation evaluation result indicating a state of the positional deviation signal amplitude;
a corrective kick and brake signal set generating means for generating and outputting a corrective kick and brake signal set including a kick signal followed continuously by a brake signal for the driving means, based on an evaluation result of the positional control deviation evaluation means;
an adding means for adding the corrective kick and brake signal set and the control signal, and outputting the result of the addition; and
a switching means disposed between the corrective kick and brake signal set generating means and the adding means to switch the adding of the corrective kick and brake signal set to the control signal on when the positional deviation signal is outside of the predefined range, and off when the positional deviation signal is within the predefined range,
wherein the corrective kick and brake signal set generating means starts output of the kick signal when the positional deviation signal becomes outside of the predefined range, and terminates the output of the kick signal and starts the output of the brake signal when the positional deviation signal becomes within the predefined range.

11. The magnetic disc device of claim 10, wherein the positional control deviation evaluation means has a positive threshold and a negative threshold as decision thresholds, these thresholds being positive and negative in relation to a reference potential of the positional deviation signal, and
evaluating the positional deviation signal includes deciding the state of the amplitude of the positional deviation based on the following states:
a first state in which the amplitude is between the positive threshold and the negative threshold;
a second state in which the amplitude is equal to or greater than the positive threshold; and
a third state in which the amplitude is equal to or less than the negative threshold.

12. The magnetic disc device of claim 11, wherein the corrective kick and brake signal set generating means receives the positional control deviation evaluation result as an input and is operable to, when the decision result is the second state or the third state, apply a corrective kick signal with a certain height in a direction that reduces the positional control deviation represented by the positional deviation signal to the driving means until the decision result enters the first state, remember the interval during which the second state or the third state obtained, and immediately after the first state is entered, apply a corrective brake signal having a certain height and operable to reduce the positional deviation speed to zero to the driving means for an interval equal to or less than the remembered interval.

13. The magnetic disc device of claim 10, wherein the predefined range is within a range of relative positional error detection by the positional deviation signal detection means.

14. The magnetic disc device of claim 10, wherein the positional control deviation evaluation means evaluates the positional deviation signal on a five-point scale.

15. The magnetic disc device of claim 10, wherein the positional control deviation evaluation means receives the positional deviation signal as input, has as decision thresholds a first positive threshold, a second positive threshold greater than the first positive threshold, a first negative threshold, and a second negative threshold less than the first negative threshold, these thresholds being positive and negative in relation to a reference potential of the positional deviation signal, and is operable to decide which of the following input states obtains:
a first state in which the amplitude is between the first positive threshold and the first negative threshold;
a second state in which the amplitude is equal to or greater than the first positive threshold and less than the second positive threshold;
a third state in which the amplitude is equal to or less than the first negative threshold and greater than the second negative threshold;
a fourth state in which the amplitude is equal to or greater than the second positive threshold; and
a fifth state in which the amplitude is equal to or less than the second negative threshold.

16. The magnetic disc device of claim 15, wherein the corrective kick and brake signal set generating means receives the positional control deviation evaluation result as an input and is operable to, when the decision result is the second state or the third state, apply a corrective kick signal with a first certain height in a direction that reduces the positional control deviation represented by the positional deviation signal to the driving means until the decision result enters the first state, remember a first interval during which the second state or the third state obtained, and immediately after the first state is entered, apply a corrective brake signal having the first certain height and operable to reduce the positional deviation speed to zero to the driving means for an interval equal to or less than the remembered first interval, and
is operable to, when the decision result is the fourth state or the fifth state, apply a corrective kick signal with a second certain height set to an amplitude equal to or greater than the corrective kick signal of the first certain height in a direction that reduces the positional control deviation represented by the positional deviation signal to the driving means until the decision result enters the second state or the third state, respectively, remember a second interval during which the fourth state or the fifth state obtained, and immediately after the second state or the third state is entered, apply a corrective brake signal having the second certain height, operable to reduce the positional deviation speed to zero, to the driving means for an interval equal to or less than the remembered second interval.

17. The magnetic disc device of claim 10, further comprising a phase advancing means disposed preceding the positional control deviation evaluation means, operable to amplify a high-frequency component in a vicinity of a discretizing frequency of a discretized positional deviation signal.

18. The magnetic disc device of claim 17, wherein the phase advancing means is a predictive holding means that performs the following operation:

out(k)=in(k)+K{in(k)-in(k-1)}

(where out(k) is output, in(k) is input, k being an arbitrary natural number, and K is a temporal prediction coefficient).

19. A disc device comprising:
  a disc;
  a read/write device for recording or reproducing information on the disc;
  a driving means for performing a predetermined operation on the read/write device in relation to the disc, based on a driving control signal;
  a positional deviation signal detection means for detecting a relative positional error between the read/write device and the disc on the basis of information obtained from the disc and outputting a positional deviation signal;
  a control signal generating means for generating a control signal defining a control quantity in the predetermined operation, based on the positional deviation signal obtained from the positional deviation signal detection means;
  a positional control deviation evaluation means for receiving the positional deviation signal as an input, evaluating the positional deviation signal from the positional deviation signal detection means by judging whether the positional deviation signal is within a predefined range, and outputting a positional control deviation evaluation result indicating a state of the positional deviation signal amplitude;
  a corrective kick and brake signal set generating means for generating and outputting a corrective kick and brake signal set including a kick signal followed continuously by a brake signal for the driving means, based on an evaluation result of the positional control deviation evaluation means;
  an adding means for adding the corrective kick and brake signal set and the control signal, and outputting the result of the addition; and
  a switching means disposed between the corrective kick and brake signal set generating means and the adding means to switch the adding of the corrective kick and brake signal set to the control signal on when the positional deviation signal is outside of the predefined range, and off when the positional deviation signal is within the predefined range,
  wherein the corrective kick and brake signal set generating means starts output of the kick signal when the positional deviation signal becomes outside of the predefined range, and terminates the output of the kick signal and starts the output of the brake signal when the positional deviation signal becomes within the predefined range.

20. The disc device of claim 19, wherein the predefined range is within a range of relative positional error detection by the positional deviation signal detection means.

* * * * *